(12) United States Patent
Rubin

(10) Patent No.: US 8,280,831 B1
(45) Date of Patent: Oct. 2, 2012

(54) TYPE 6 KASER (KNOWLEDGE AMPLIFICATION BY STRUCTURED EXPERT RANDOMIZATION) FOR PROVIDING CASE-BASED INDUCTIVE AND ANALOGICAL REASONING

(75) Inventor: Stuart H. Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 455 days.

(21) Appl. No.: 12/683,655

(22) Filed: Jan. 7, 2010

Related U.S. Application Data

(63) Continuation-in-part of application No. 12/430,224, filed on Apr. 27, 2009, now Pat. No. 8,117,147, and a continuation-in-part of application No. 12/390,633, filed on Feb. 23, 2009, now Pat. No. 8,073,804.

(51) Int. Cl.
*G06F 15/18* (2006.01)
(52) U.S. Cl. ........................................................ 706/12
(58) Field of Classification Search ........................ None
See application file for complete search history.

(56) References Cited

U.S. PATENT DOCUMENTS 7,047,226 B2 *  5/2006  Rubin .............................. 706/47
7,840,585 B2 * 11/2010  Ramsey et al. ................ 707/764

OTHER PUBLICATIONS

Rubin et al., "T2K2: A Type II KASER", May 2006, Information Reuse and Integration, pp. 147-153.*

* cited by examiner

*Primary Examiner* — David R Vincent
*Assistant Examiner* — Paulinho E Smith
(74) *Attorney, Agent, or Firm* — Ryan J. Friedl; Kyle Eppele

(57) ABSTRACT

A system and method for inductive and analogical reasoning provide capabilities for generalization, creative reasoning, possibilistic analysis, massive parallelism, and distributed processing. The system and method involve using matched cases/generalizations/analog inferences from a case base or generalization/analog base to provide output inferences based upon a user-supplied context. A user then provides feedback to indicate that the output inference is either correct or incorrect. If the user indicates that the output is incorrect, new rules may be computer-generated during runtime by performing, for example, an analogical contextual transformation. If the user indicates that the output is correct, the matched case/generalization/analog may be moved to the head of its respective base.

16 Claims, 9 Drawing Sheets

TYPE 6 KASER (KNOWLEDGE AMPLIFICATION BY STRUCTURED EXPERT RANDOMIZATION) FOR PROVIDING CASE-BASED INDUCTIVE AND ANALOGICAL REASONING

CROSS-REFERENCE TO RELATED APPLICATIONS

This application is a continuation-in-part of U.S. Non-provisional patent application Ser. No. 12/430,224, filed Apr. 27, 2009 now U.S. Pat. No. 8,117,147, entitled "Type 4 KASER (Knowledge Amplification by Structured Expert Randomization) Providing Case-Based Inductive and Analogical Reasoning", and U.S. Non-provisional patent application Ser. No. 12/390,633, filed Feb. 23, 2009 now U.S. Pat. No. 8,073,804, entitled "System and Method for Type 2 KASER (Knowledge Amplification by Structured Expert Randomization)," the entire content of both being fully incorporated by reference herein.

FEDERALLY SPONSORED RESEARCH AND DEVELOPMENT

The Type 6 KASER for Providing Case-Based Inductive and Analogical Reasoning is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 99882.

BACKGROUND

First-generation expert systems are known in the database processing arts as production systems where the knowledge base and inference engine are disjointed. Second-generation expert systems are improved in the art to include a rudimentary learning capability, which may be implemented by the interpretation of grids or by user query. Third-generation expert systems are further improved to provide for rule base learning through the use of deductive and inductive processes.

Conventional analysis of information includes manually combing through vast databases and unstructured text/reports. An alternative method would be to use a database computer language such as structured query language (SQL) to perform directed mining operations. This approach is not fully general, is difficult and costly to maintain, and does not provide a capability for linking database events. Moreover, such database mining is less than optimal at rendering conclusions and probabilities, as rendering conclusions may require association of ostensively random events. An example of event-related activity for detection would be detection based on a previously acquired signature of the activity.

Conventional expert systems require that all knowledge be hand-tailored and manually checked for validity and consistency. In particular, conventional alternatives are either not creative or do not reason using symbolic knowledge; i.e., computing with words. Conventional analysis of information includes manually combing through vast databases and unstructured text/reports. For purposes of data analysis, a given concept may be broadly defined or defined within a particular context. This may or may not have a direct correspondence to a general definition of the concept, but relates to a specific aspect of the concept. Therefore, substantial human analogical reasoning is required.

U.S. Pat. No. 7,047,226, to Stuart H. Rubin, titled "System and Method for Knowledge Amplification Employing Structured Expert Randomization" describes a Type 1 Knowledge Amplification Employing Structured Expert Randomization (KASER) engine. U.S. Non-provisional patent application Ser. No. 12/390,633, filed Feb. 23, 2009, by Stuart H. Rubin, titled, "System and Method for Type 2 KASER (Knowledge Amplification by Structured Expert Randomization)" describes the general concept of a Type 2 KASER engine. The Type 1 KASER is described as allowing the user to supply declarative knowledge in the form of a semantic tree using single inheritance. In a Type 1 KASER, words and phrases are entered into the system by an operator by means of, for example, pull-down menus. In this manner, semantically identical concepts (e.g., Hello and Hi) may be entered with equivalent syntax by the operator to avoid diluting the learning efficiency of the KASER. The Type 2 KASER is described as automatically inducing this semantic tree, and having means for performing randomization and set operations on the property trees that are acquired by way of, for example, database query and user-interaction. Distinct syntax may be logically equated by the operator to yield the equivalent normalized semantics.

A need exists for an expert system architecture that may automatically expand the rule base without the concomitant data input burden associated with error correction needed to optimize expert system performance. An expert system that includes learning means for acquiring a rule system that functions as a larger virtual rule system with reduced error probability has, until now, been unavailable in the art. These unresolved problems and deficiencies are clearly felt in the art and are solved by the present subject matter in the manner described below.

DETAILED DESCRIPTION OF SOME EMBODIMENTS

The Type 6 KASER (T6K) is a new technology for inductive and analogical reasoning. It offers capabilities for generalization, creative reasoning, possibilistic analysis, massive parallelism, and distributed processing. It can provide unprecedented decision and creative support (e.g., for UAVs, robotics, et al.). The T6K is capable of greater creativity, error checking, and supra-linear learning and forgetting. The T6K creates analogs at runtime and generalizations when idle or in dream mode, which can greatly enlarge the space of potential responses. The underpinning science that makes this performance improvement possible is that of randomization—decreasing entropy.

Figure 1:
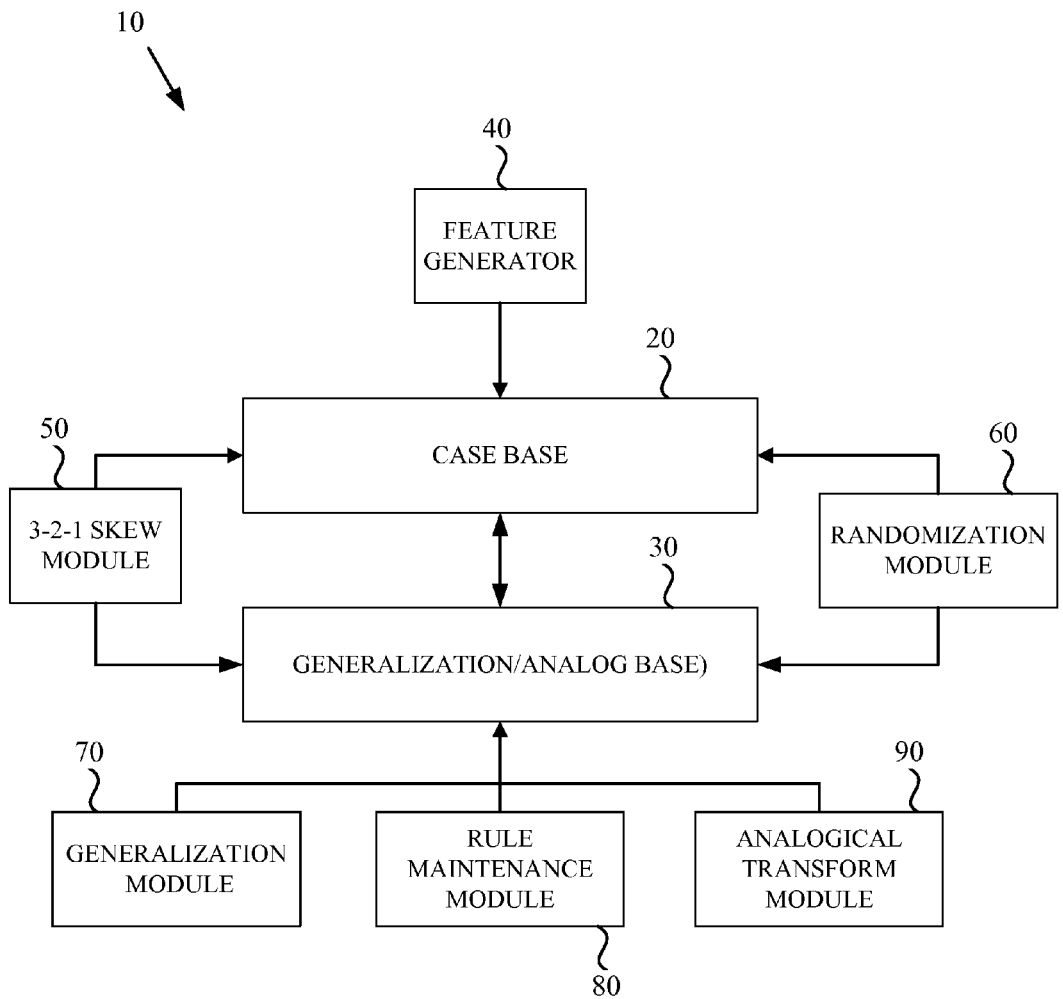
FIG. 1 shows a block diagram of one embodiment of a system in accordance with the Type 6 KASER for Providing Case-Based Inductive and Analogical Reasoning.

FIG. 1 shows a block diagram of one embodiment of a system 10 in accordance with the Type 6 KASER for Providing Case-Based Inductive and Analogical Reasoning. System 10 may include a case base 20, generalization/analog (G/A) base 30, feature generator 40, 3-2-1-skew module 50, randomization module 60, generalization module 70, rule maintenance module 80, and analogical transform module 90.

The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The Type 6 KASER systems and methods described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. Operation of the modules will be discussed in more detail with respect to the methods described herein. The methods described herein may be implemented as a program product comprised of a plurality of such modules, which can be interactively displayed for a user on a display screen of a data-processing system (e.g., computer). Such interactivity may be provided by a specialized graphical user interface, such as that shown in FIG. 3. Further, in some embodiments, feature generator 40 may be used to provide feature evolution capabilities, as will be discussed in more detail below.

Figure 2:
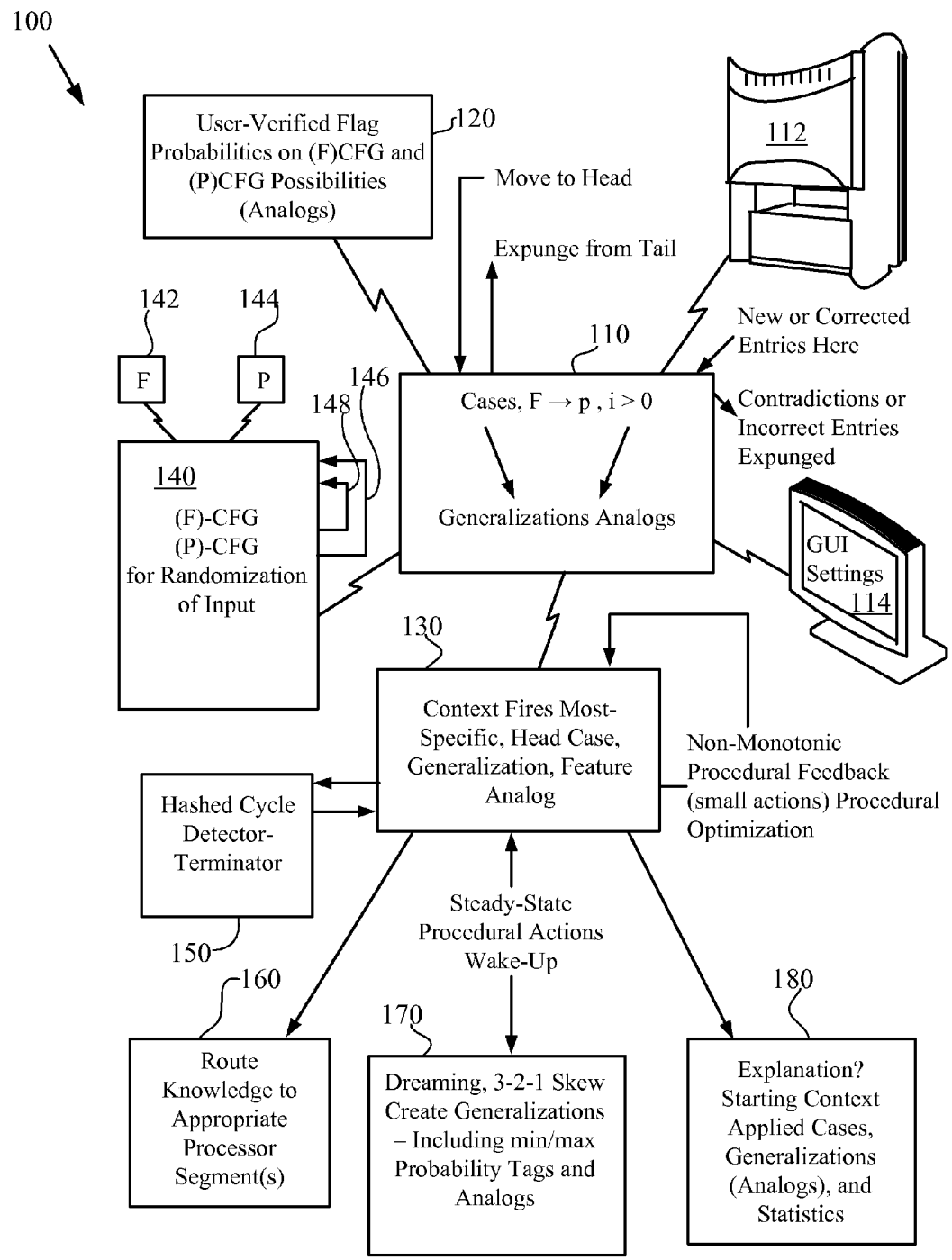
FIG. 2 shows a block diagram of an embodiment of a system methodology in accordance with the Type 6 KASER for Providing Case-Based Inductive and Analogical Reasoning.

FIG. 2 shows a block diagram of an embodiment of a system methodology in accordance with the Type 6 KASER for Providing Case-Based Inductive and Analogical Reasoning. An abstraction module 110 applies a set of matched cases, generalizations, or analogs ("matched cases/generalizations/analog inferences") from a case base (such as case base 20 of FIG. 1) or a generalization/analog base (such as G/A base 30 of FIG. 1). The matched cases/generalizations/analog inferences are maintained in a hierarchy. Abstraction module 110 functions as an inference engine by using the matched cases/generalizations/analog inferences to provide, as its output, inferences based upon the matched cases/generalizations/analog inferences. Abstraction module 110 establishes a hierarchical order of the matched cases/generalizations/analog inferences, and in the case of matched cases/generalizations/analog inferences, which are determined to have a high validity, moves that matched cases/generalizations/analog inference to the head of the hierarchy.

In the case of the matched cases/generalizations/analog inference being deemed invalid or having a low validity and exceeding a predetermined capacity of the hierarchy, the matched cases/generalizations/analog inferences are expunged. Abstraction module 110 may function alone or use external computer 112. External computer 112 may be any computer capable of resolving the matched cases/generalizations/analog inferences in the hierarchy. For example, external computer 112 may comprise a SiCortex 5832 supercomputer, which is capable of rapidly processing substantial amounts of data.

Also shown in FIG. 2 are user-verified flag possibilities 120, context-free grammar (CFG) module 140, GUI settings 114 and context firing module 130, which are all linked to abstraction module 110. In addition, user-verified flag possibilities 120, CFG module 140, GUI settings 114, and context firing module 130 provide, in the case of user input, user interfaces.

User-verified flag possibilities 120 allow the user to flag probabilities on feature context-free grammar 142 or distinct procedural context-free grammar 144 possibilities or analogs. CFG module 140 provides scrollable mnemonic pop-up lists. Feature context-free grammar 142 is referred to as (F) CFG and distinct procedural context-free grammar 144 is referred to as (P) CFG. CFG module 140 is used for randomization of input and provides a "move to head" function, indicated by arrow 146, and iteratively expunges unreferenced productions ("forgets"), indicated by arrow 148. Context firing module 130 fires the most-specific, head case, generalization or feature analog, and uses a non-monotonic procedural feedback to effect small actions and to achieve procedural optimization.

FIG. 2 also depicts hashed cycle detector and terminator 150, routing module 160, explanation module 170 and dreaming module 180. Routing module 160 routes knowledge to the appropriate processor segments. Explanation module 170 provides explanations of the matched cases/generalizations/analog inferences fired by context firing module 130, which provides translations of the logic for user and machine use. Dreaming module 170 uses a 3-2-1 skew algorithm to create generalizations. The generalizations may include minimum and maximum probability tags and analogs. Dreaming module 170 operates during system runtime.

The use of domain-specific knowledge avoids the need to evolve or avoid knowledge that has served practitioners in any given field of study. Instead, the Type 6 KASER may be supplied with rule-like knowledge by a domain expert. It then not only is capable of applying that knowledge, but can also use it to infer new knowledge that is available through deduction. That knowledge, along with previously validated knowledge, may itself be applied to create new knowledge, devices, formulas, etc.

The knowledge base can be scaled up because the Type 6 KASER is not limited by latent knowledge, and therefore is not limited to tractable alternatives. Thus, for example, if a particular knowledge base describes polygons for use in antennas, it is possible to induce a perfectly circular antenna based on geometric knowledge and a knowledge of electromagnetic induction.

Figure 3:
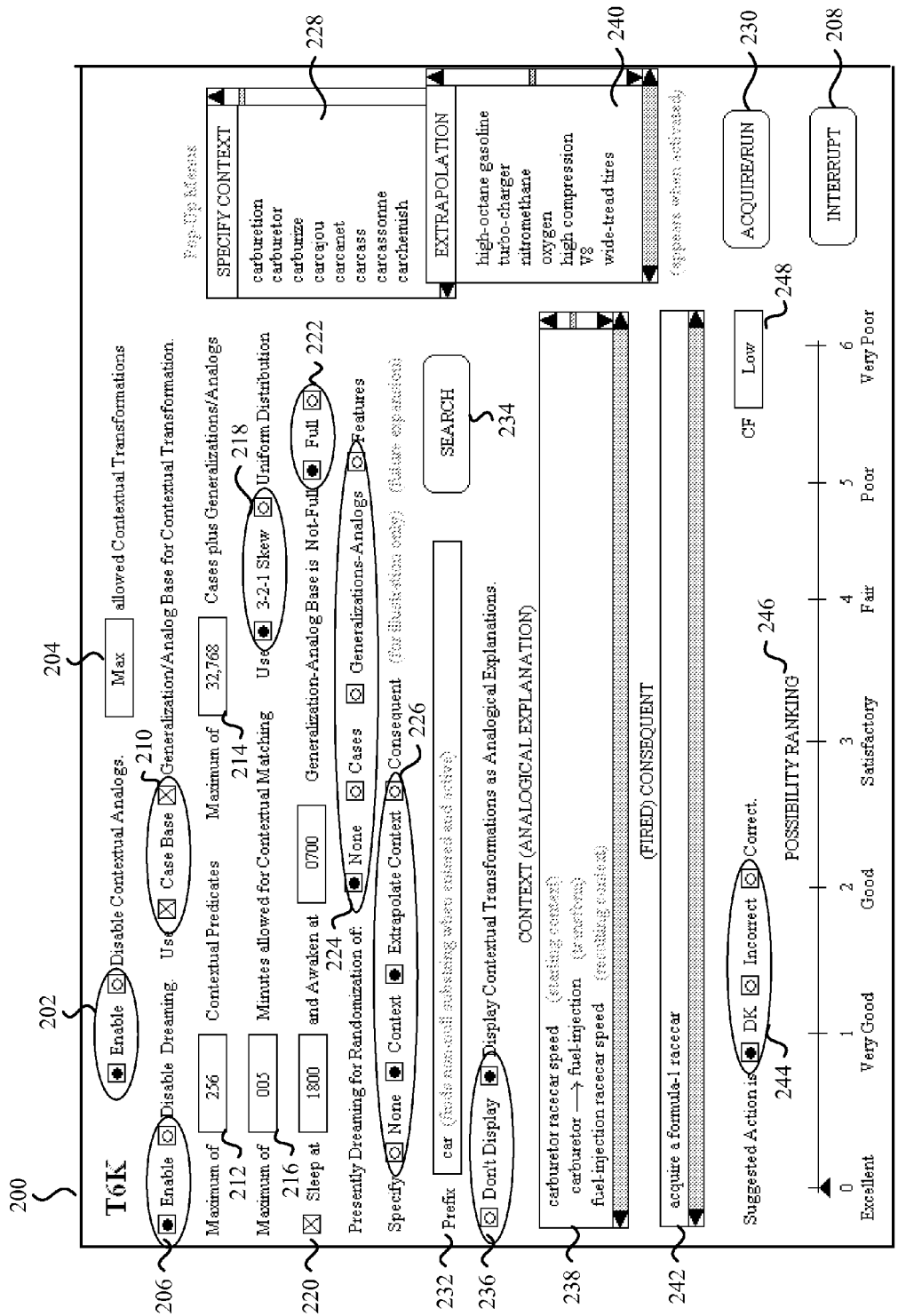
FIG. 3 shows an embodiment of a graphical user interface for use with a Type 6 KASER system and method.

FIG. 3 shows an embodiment of a graphical user interface (GUI) 200 for use with a Type 6 KASER system and method. The T6K GUI may be approximated using text files and tty input/output using Corman Lisp 3.0 to facilitate implementation. Discussed below are features of one embodiment of a T6K GUI 200 for use with the systems and methods described herein.

T6K GUI 200 may include radio buttons 202 to enable/disable the formation of contextual analogs (default is to enable—input/output), as well as a text box 204 for a user to indicate the allowed number of contextual transformation (default is to unlimited—input/output). Note that the setting is forced to zero if the formation of contextual analogs is disabled. T6K GUI 200 may further include radio buttons 206 to enable/disable dreaming (default is to enable—input/output). If enabled, dream mode is entered whenever the program would otherwise be idle, and is exited upon clicking the Interrupt button 208. The possibility indicator is also reset to zero by this action. There is no allowed idle time setting (as with screen savers) because the operating system should permit time sharing.

T6K GUI 200 also includes checkboxes 210 for a user to indicate the bases (case or G/A), which may participate in contextual transformation (default is Case Base and Generalization/Analog Base—input only). Note that both checkboxes 210 remain unchecked and grayed-out if the formation of contextual analogs is disabled. Similarly, if both checkboxes 210 are unchecked, the formation of contextual analogs is disabled and the number of allowed contextual transformations is set to zero.

T6K GUI may further include a text box 212 for a user to indicate a maximum number of base variables plus features (i.e., maximum case length with a default of 256 contextual predicates, or more—input only). This setting is useful for delimiting the number of features generated and tested concomitantly. A text box 214 is also provided to allow input of the maximum number of cases plus generalizations/analogs (default of 32,768, or more—input only). At this point, tail deletion occurs. This setting should be set with consideration of the one immediately above so as to allow for maximum processor real (i.e., not virtual) memory usage without overflow. A text box 216 is provided to allow input of the maximum time allowed for contextual matching (default of 5 minutes, but may be unlimited—input only). The system automatically enters dream mode after expiration of this period.

T6K GUI 200 further includes radio buttons 218 to select 3-2-1 Skew/Uniform Distribution (default to 3-2-1 Skew). Uniform is an experimental setting and is selected for bases whose utility does not vary with time of acquisition or use (input only). Note that the move-to-the-head procedures are always needed, since base sizes are necessarily finite and practically acquirable knowledge is not. Text boxes 220 may be used to indicate time to sleep and awaken (default is 1800 and 0700, respectively, enabled by a selected checkbox—input/output). If enabled, dreaming will occur during the specified interval—even if previously disabled, since the former only applies to dreaming when not scheduled to sleep. Radio buttons 222 are provided to allow indication that the G/A Base is Not-Full/Full (initially Not-Full—output only).

Radio buttons 224 allow for indication that the system is presently dreaming for randomization of None (default when not dreaming or sleeping)/Cases/Generalizations-Analogs/Features (output only). Features are for future expansion, but may involve the 3-2-1 Skew or Uniform Distribution radio setting in their evolution. GUI 200 allows the codes to run faster once minimized (i.e., so as not to delay output displays).

Radio buttons 226 allow for input of Context, Context Extrapolation, or Consequent specification (default is None—input only), along with a polymorphic pop-up display list 228 (i.e., if not set to None) and capability to select an option by double left-clicking the option. The context and consequent specifications are dynamically acquired (and saved to disk), through user interaction, when not present. If Context Extrapolation is selected, then dynamic pop-up display list 228 presents options, if any, in non-increasing likelihood for selection. Selecting anything but the "None" option also sets, "Don't display contextual transformations as analogical explanations." This is done so that the context box records each and only selected contextual predicates. Here, two radio buttons 226 are shown activated (for purposes of illustration only). In actuality, at most a single (larger) corresponding pop-up menu is displayed at any time. Clicking on the Acquire/Run button 230 sets this radio button to None.

T6K GUI 200 also provides a text box 232 for the case-insensitive search prefix, which is grayed-out if neither the Context nor Consequent radio button 226 is specified immediately above and is activated by clicking on the adjacent Search button 234 after entering a search prefix (input only). An absent or blank prefix works the same as entering a string of a's. Search button 234 remains grayed-out until a search prefix is entered. The use of a spellchecker is optional. If a prefix (word) is not in popup menu 232, then a popup textbox (not shown) asks the user if he/she wants to save it there (and to the disk). The popup textbox requires that the user enter a carriage return, as the final character in the prefix, before it will appear.

Radio buttons 236 allow a determination to display contextual transformations as analogical explanations (default is Display—input/output). Button 236 is set to, "Don't display" and is grayed out if the formation of contextual analogs is disabled. Otherwise, selecting, "Display contextual transformations as analogical explanations" forces radio button 226 to be set to "None" in the specification of context, extrapolate context, or consequent above.

T6K GUI 200 also displays, via text box 238, the previously entered Context, if any (input/output). Textbox 238 displays the user-supplied context/extrapolations and the iterative machine-generated transformations thereof (i.e., analogical explanations), when enabled as previously described. If radio button 226 is set to specify the context, then each phrase (delimited by a space) is entered in the Specify Context pop-up menu 228, if not already present, and extrapolations are displayed in pop-up menu 240, upon clicking Acquire/Run button 230.

A textbox 242 is also provided for the Specified or Fired Consequent (input/output), when enabled as previously described. If radio button 226 is set to specify the consequent, then each phrase (delimited by a space) is entered in the Specify Consequent pop-up menu 228, if not already present, upon clicking the Acquire/Run button 230.

T6K GUI 200 also provides radio buttons 244 for user feedback on the validity of the Fired Consequent—DK/Incorrect/Correct (default is DK—input only). Note that the appropriate base(s) are updated whenever Acquire/Run button 230 is clicked. A possibility indicator 246 is also reset to zero by this action. A second indicator showing the maximum possibility in a fired rule sequence is not needed here because such automated successive rule firing is not enabled. A confidence factor textbox 248 may display three distinct values; namely, "High", "Medium", or "Low" (default is "Low"—output only).

Possibility indicator 246 may take the form of a slider for presenting the Possibility Ranking of the Fired Consequent (output only). Note that this slider will remain at zero so long as the formation of contextual analogs is disabled. Otherwise, the default range is [0, 6] with a default value of 0. The running program may expand this range, which will not alter the position of the seven labels. For example, after encountering a possibility ranking of 7, the corresponding integers would be updated and enumerated as follows (e.g., 0, 2, 4, 6, 8, 10, 12)—with the slider positioned at 7. No tick on the abscissa may have a fractional correspondence. This is accomplished by multiplying the default range by the next integer in succession—in this case 2.

Acquire/Run button 230 is provided to effect selections made on GUI 200 as noted above, and execute the algorithm when appropriate. Interrupt button 208 is provided to override the number of minutes allowed for contextual matching, specified time for sleeping, or idle dreaming, as appropriate. Double-clicking on Interrupt button 208 serves to put the system in dream mode.

Figure 4:
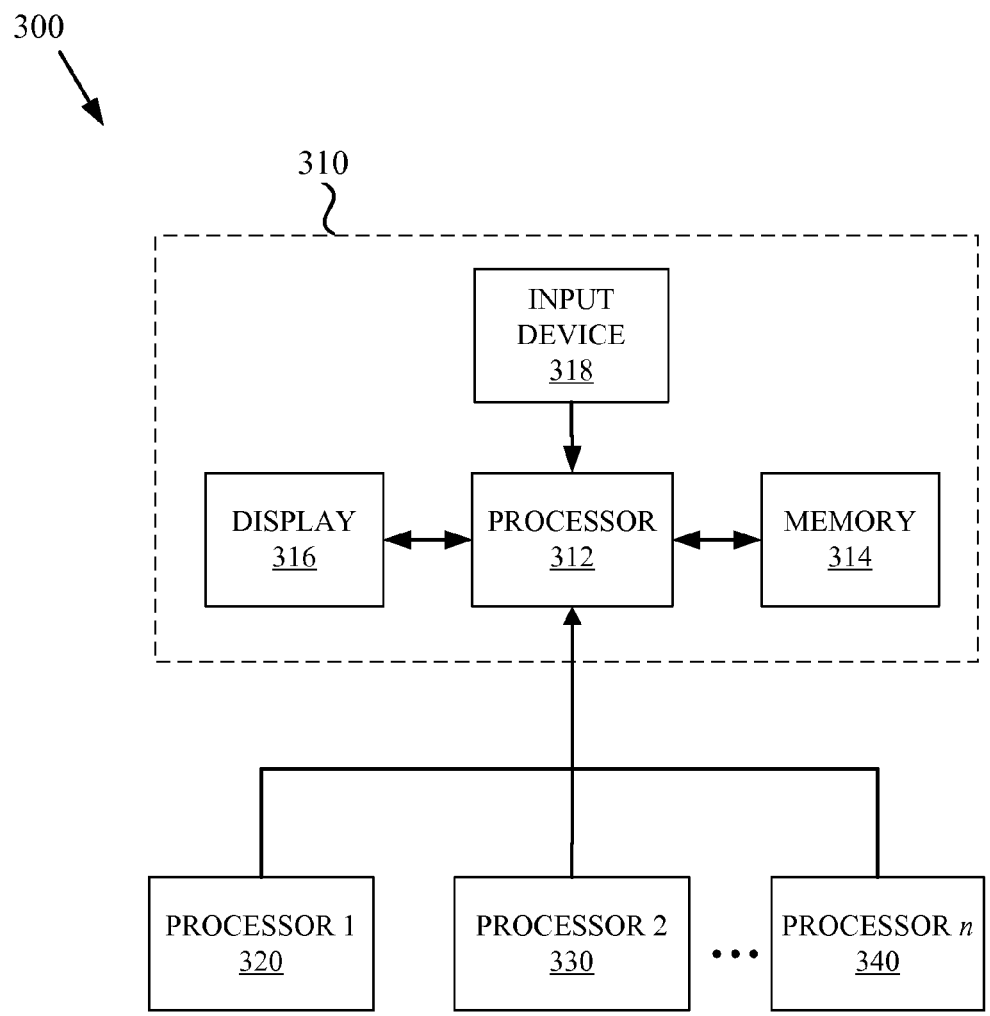
FIG. 4 shows a block diagram of an embodiment of a distributed processor system in accordance with the Type 6 KASER for Providing Case-Based Inductive and Analogical Reasoning.

FIG. 4 shows a block diagram of an embodiment of a distributed processor system 300 in accordance with the Type 6 KASER for Providing Case-Based Inductive and Analogical Reasoning. System 300 may include a computer 310 having processors 320, 330, and 340 connected thereto. Computer 310 may include a processor 312, memory 314, display 316, and input device 318, such as a keyboard or mouse. System 300 may be used to provide an increase in computing capacity by allowing processor 312 to coordinate processors 320, 330, and 340 such that maximum processing capabilities are achieved.

Figure 5:
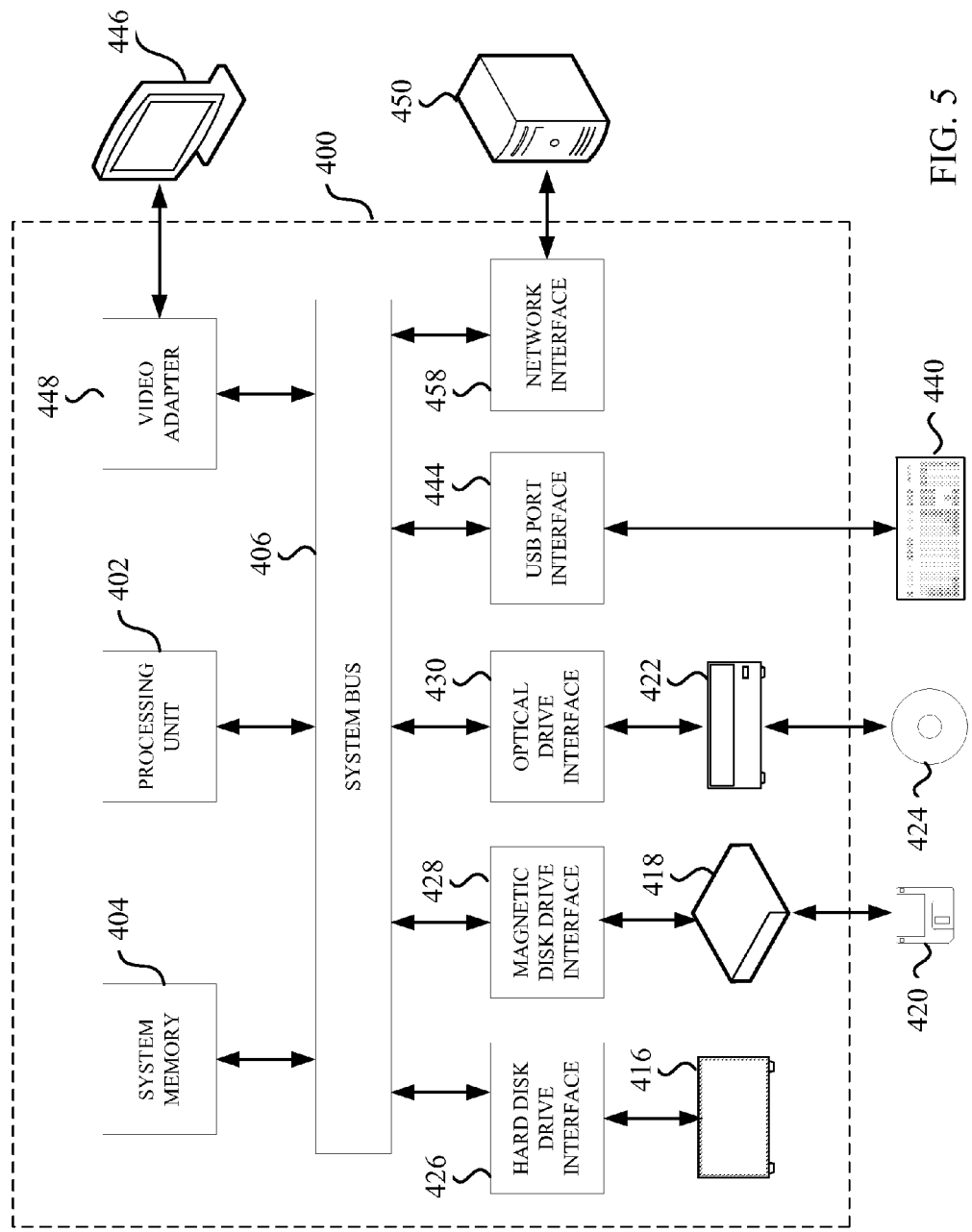
FIG. 5 shows a block diagram of an embodiment of a computing system for implementing and performing a method in accordance with the Type 6 KASER for Providing Case-Based Inductive and Analogical Reasoning.

FIG. 5 shows a block diagram of an embodiment of a computing system that may be used to implement a method in accordance with the T6K for Providing Case-Based Inductive and Analogical Reasoning. FIG. 5 and the following description are intended to provide a brief, general description of a suitable computing environment in which an embodiment of a T6K method may be implemented. Although not required, a T6K method will be described in the general context of computer-executable instructions, such as program modules, being executed by a personal computer. Moreover, those skilled in the art will appreciate that embodiments of a T6K method may be practiced with other computer system configurations, including hand-held devices, multiprocessor systems, microprocessor-based or programmable consumer electronics, network personal computers, minicomputers, mainframe computers, and the like. Embodiments of the method may also be practiced in distributed computing environments where tasks are performed by remote processing devices that are linked through a communications network (such as shown in FIG. 4). In a distributed computing environment, program modules may be located on both local and remote memory storage devices.

System 400 may include a general-purpose computing device in the form of a conventional personal computer 400, which includes processing unit 402, system memory 404, and system bus 406 that operatively couple various system components to other system components (e.g., system bus 406 operatively couples system memory 404 to processing unit 402). Examples of system bus 406 include a memory bus, memory bus controller, peripheral bus and local bus using any of a variety of known bus structures. System memory 404 may include read only memory, random access memory and basic input/output system.

System 400 further includes hard disk drive 416 for reading from and writing to a hard disk (not shown) a magnetic disk drive 418 for reading from or writing to a removable magnetic disk 420 (e.g., 4.5-inch disk), and an optical disk drive 422 for reading from and writing to a removable optical disk 424 (e.g., CD-ROM and DVD). Hard disk drive 416, magnetic disk drive 418 and optical disk drive 422 are operatively connected to system bus 406 via hard disk drive interface 426, magnetic disk drive interface 428 and optical drive interface 430, respectively. The drives and their associated computer-readable media provide non-volatile storage of computer readable instructions, information structures, program modules and other information for personal computer 400.

The method steps of embodiments of the T6K method may be stored on a hard disk, magnetic disk 420, and optical disk 424. Although the exemplary environment described herein employs a hard disk, magnetic disk 420 and optical disk 424, it should be appreciated by those skilled in the art that other types of computer readable media that may store information accessible by a computer, (e.g., magnetic cassettes, flash memory cards, digital video disks, Bernoulli cartridges, random access memories, and read only memories) may also be used in the exemplary operating environment without departing from the scope or spirit of embodiments of the method.

A user may enter commands and information into personal computer 400 via input devices such as keyboard 440 and pointing devices (e.g., mouse and trackball) (not shown in FIG. 5). Examples of input devices include a microphone, joystick, game pad, and satellite dish. Input devices may be operatively connected to processing unit 402 via universal serial bus (USB) port interface 444 that is operatively connected to system bus 406. Input devices may also be operatively connected to processing unit 402 via other interfaces (e.g., parallel port, serial port and game port) that are operatively connected to system bus 406. Monitor 446 is operatively connected to system bus 406 via video adapter 448. Other peripheral devices (e.g., speakers and printers) may be operatively connected to system 400 via other interfaces. System 400 may operate in a networked environment using logical connections to one or more remote computers such as remote computer 450 via network a network, such as a local area network, wide area network, and wireless network. Examples of remote computer 450 include a personal computer, server, router, networked personal computer, peer device, and network node.

FIGS. 6A-6D show flowcharts of an embodiment of a method 500 in accordance with the Type 6 KASER for Providing Case-Based Induction and Analogical Reasoning. Some or all of the steps of method 500 may be performed by a computer having a processing device connected thereto, such as computer 400 shown in FIG. 5 or system 300 shown in FIG. 4. Such computing devices/systems may be programmed with the various modules shown in FIGS. 1 and 2 and GUI 200 shown in FIG. 3.

Method 500 may begin at step 510, which involves storing, in at least one memory storage device in a computer, a case base and a G/A base. As an example, case base 20 and G/A base 30 of FIG. 1 may be stored in memory 404 of computer 400. In some embodiments, the case base comprises user-validated knowledge statements and the G/A base comprises computer-generated knowledge statements. Each of the user-validated knowledge statements and the computer-generated knowledge statements comprise a consequent and an antecedent with more than one antecedent feature. Step 520 may then involve receiving, from a computer input device, such as keyboard 440, a user-specified context comprising more than one context feature. As an example, the user may input the user-specified context via GUI 200. Method 500 may then proceed to step 530, which involves searching the case base for a user-validated knowledge statement having antecedent features that match each of the context features. As an example, step 530 may be performed by processor 402.

Step 540 may involve making a determination as to whether a matching statement is found. As an example, step 540 may be performed by processor 402. A matching statement is a user-validated knowledge statement having antecedent features that match the context features. If a matching statement is found, step 550 involves displaying the user-validated knowledge statement consequent to the user via a display device, such as display 446. If, at step 540, a matching statement is not found, method 500 proceeds to step 630 shown in FIG. 6C. Step 560 then involves receiving user feedback regarding the displayed user-validated knowledge statement consequent. The user feedback may be input by a user via GUI 200.

Figure 6A:
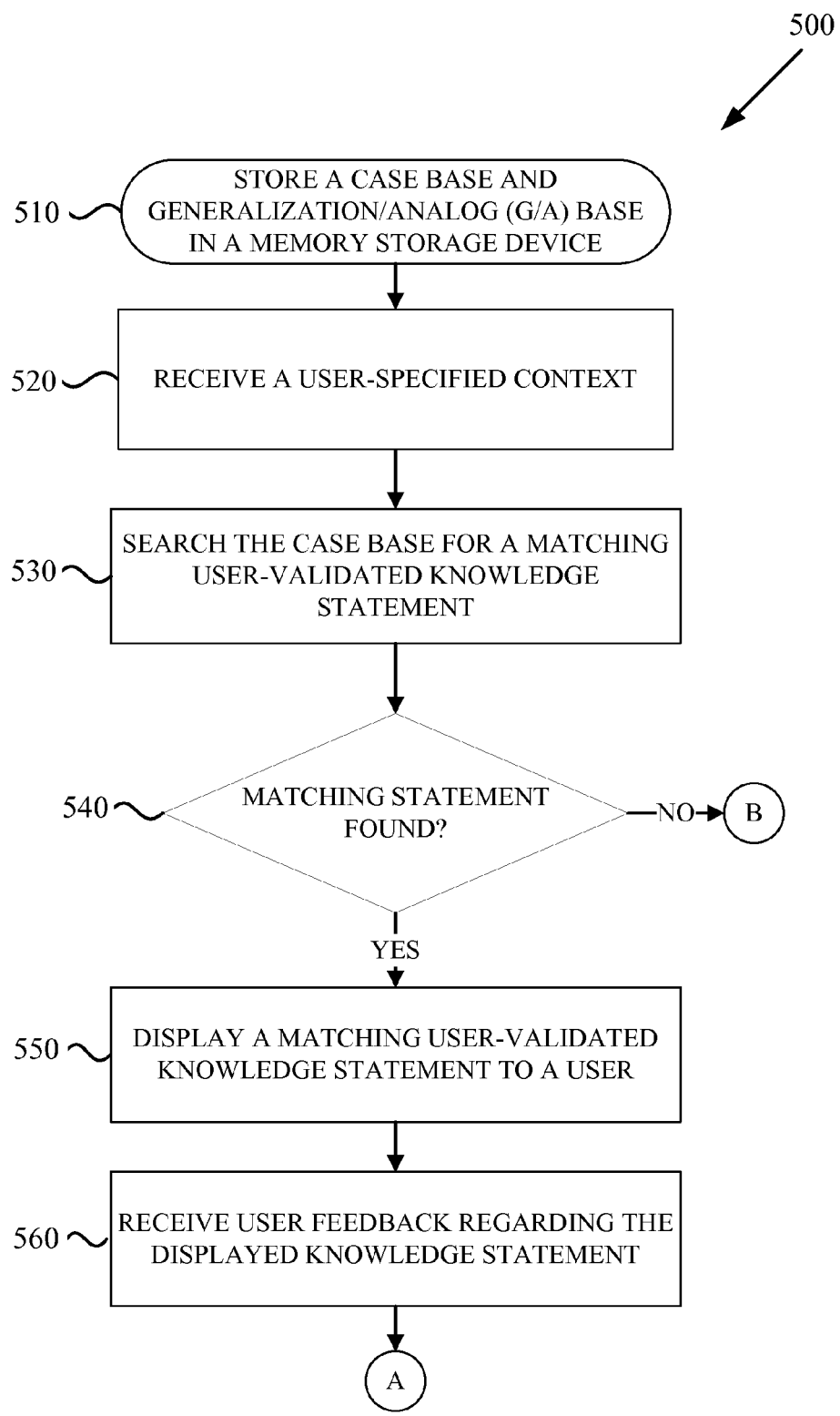
FIGS. 6A-6D show flowcharts of an embodiment of a method in accordance with the Type 6 KASER for Providing Case-Based Inductive and Analogical Reasoning.
Figure 6B:
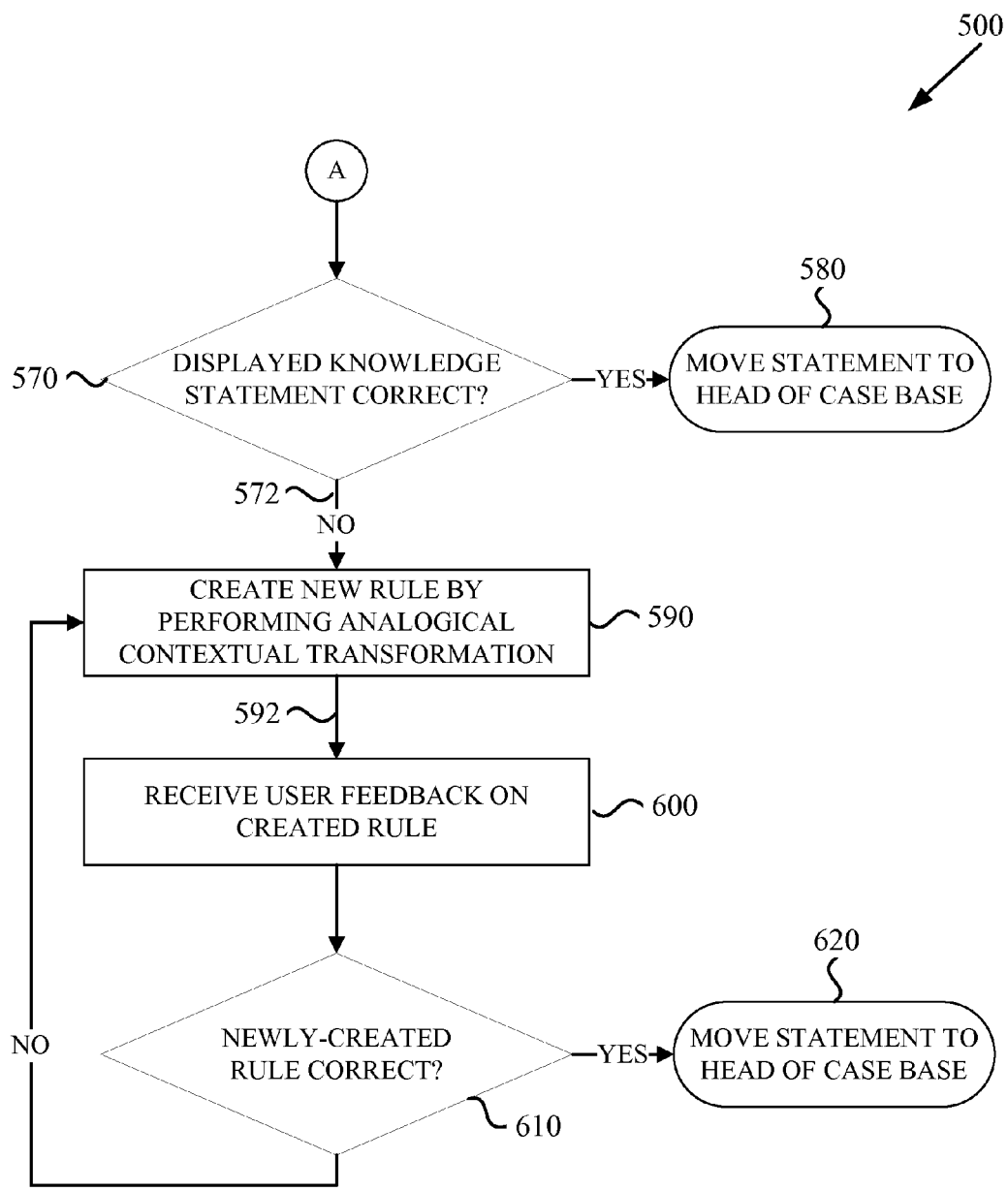

Method 500 may then proceed to step 570, as shown in FIG. 6B. Step 570 involves a determination as to whether the user feedback indicates that the user-validated knowledge statement consequent is correct. For example, step 570 may be performed by processor 402. If so, step 580 involves moving the statement having antecedent features that match the context features to the head of the case base. As an example, such movement may occur via rule maintenance module 80 of FIG. 1, such module being stored within memory 404 and called by processor 402. If the user feedback indicates the user-validated knowledge statement consequent is incorrect, step 590 involves creating, during runtime, a new rule by performing an analogical contextual transformation. The analogical contextual transformation of step 590 may be performed by analogical transform module 90 shown in FIG. 1, and may include several sub-steps. As an example, step 590 may be performed by processor 402 utilizing one or more modules stored in memory 404.

Figure 6C:
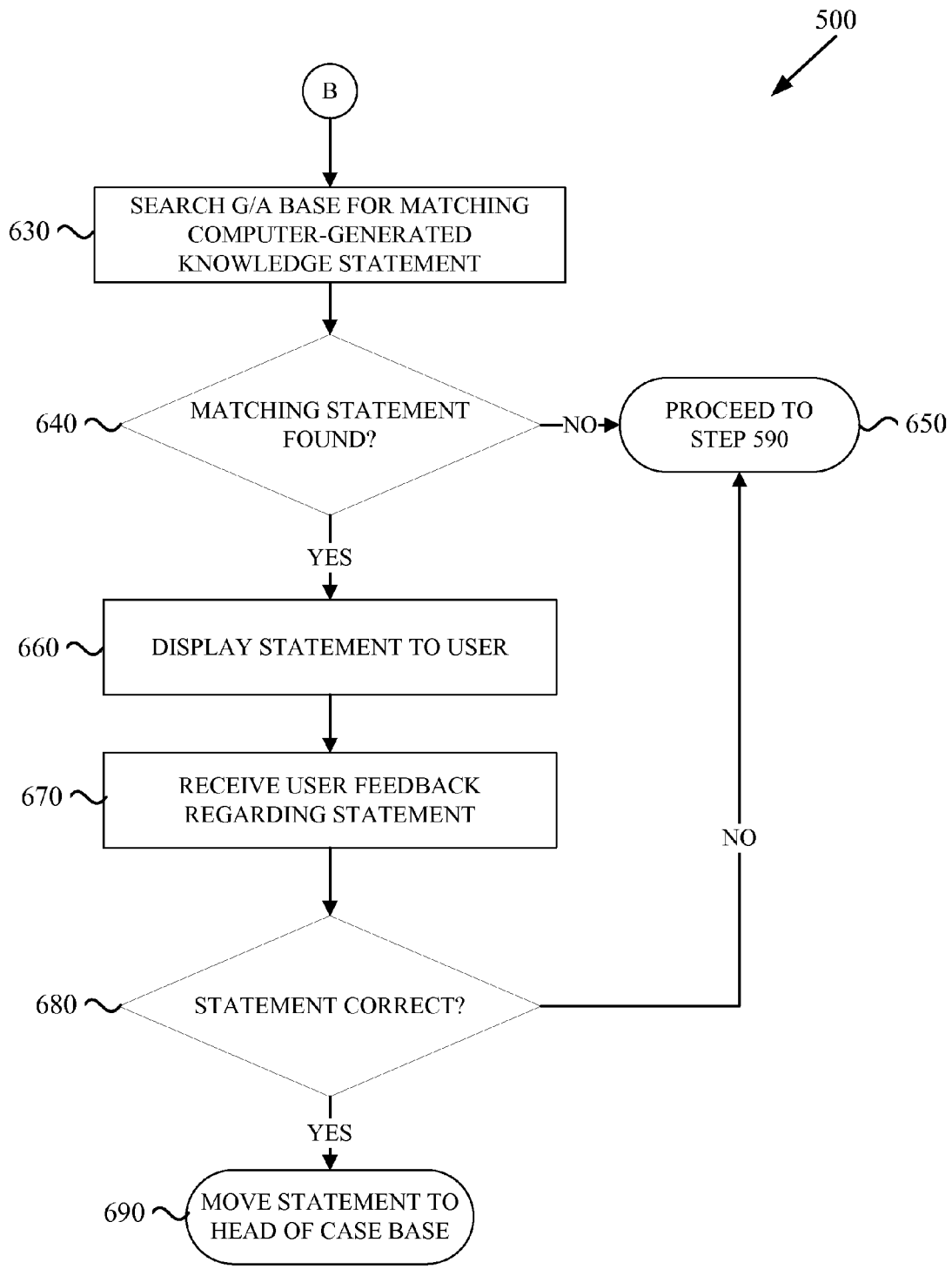
Figure 6D:
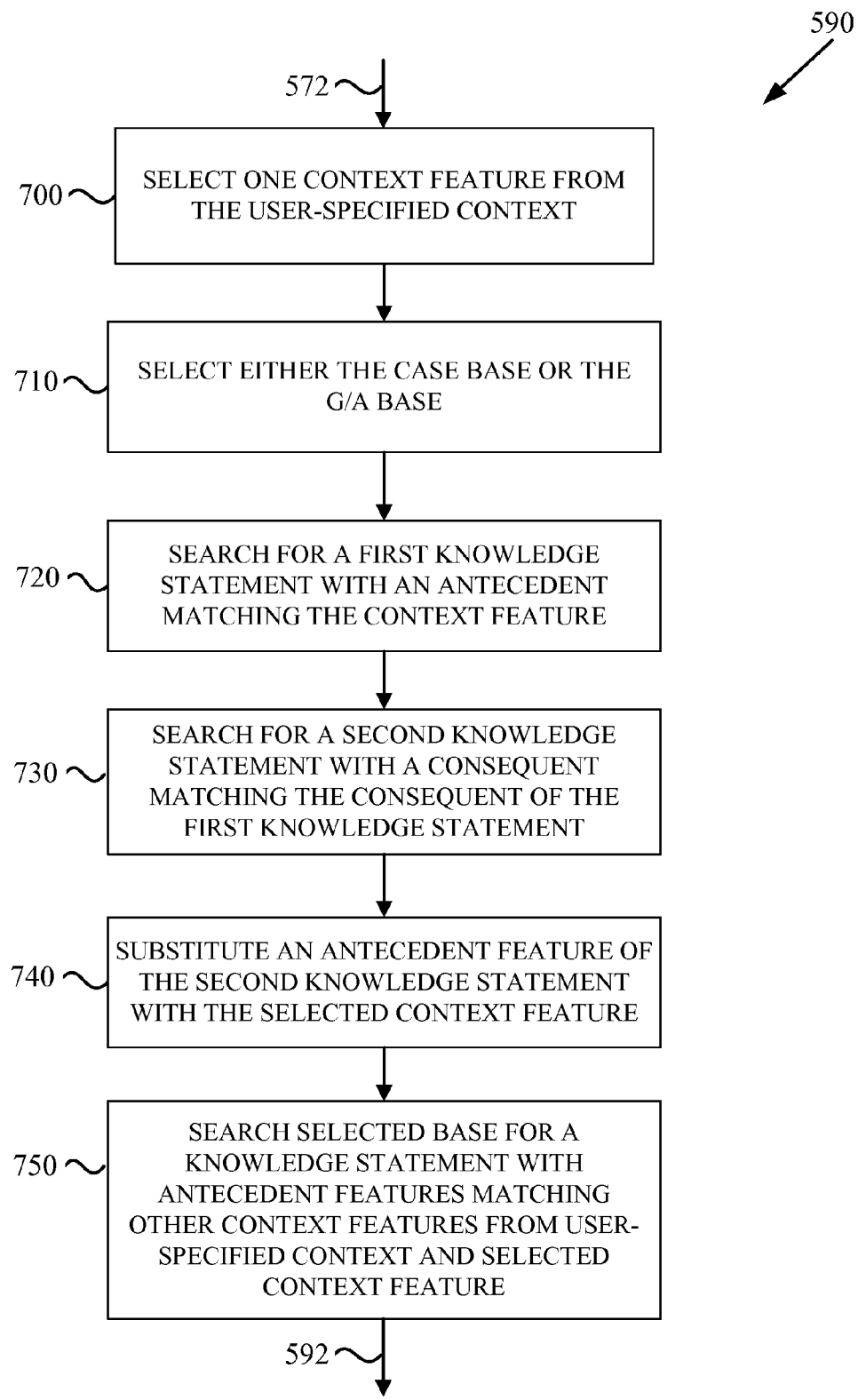

As shown in FIG. 6D, step 590 may begin at step 700, which involves selecting one context feature from the user-specified context. Step 710 may then involve selecting, by chance in proportion to the size of the base, the case base or the G/A base. The determination as to which base is selected may be performed by randomization module 60 as shown in FIG. 1. Step 720 may then involve searching the selected base for a first knowledge statement having an antecedent feature that matches the context feature. Step 590 may then proceed to step 730, where the selected base is searched for a second knowledge statement having a consequent that matches the consequent of the first knowledge statement. If such a knowledge statement is found, step 740 involves substituting an antecedent feature of the second knowledge statement with the selected context feature. Step 750 may then involve searching the selected base for a knowledge statement including antecedent features matching the other context features from the user-specified context and the selected context feature.

Following step 590, step 600 involves receiving user feedback regarding the created rule. Step 610 involves a determination as to whether the newly-created rule is correct. If so, step 620 involves moving the newly-created rule to the head of the case base. Step 620 may be performed by rule maintenance module 80. If the newly-created rule is incorrect, method 500 proceeds back to step 590, where a new rule is created.

Referring back to step 540, if a matching statement is not found, method 500 continues to step 630, as shown in FIG. 6C. Step 630 involves searching the G/A base for a computer-generated knowledge statement having antecedent features that match the context features. Step 640 then involves a determination as to whether a matching statement is found. If a computer-generated knowledge statement having antecedent features that match the context features is not found, step 650 involves method 500 proceeding to step 590 wherein a new rule is created by performing an analogical contextual transformation. If a matching statement is found at step 640, step 660 involves displaying the computer-generated knowledge statement consequent to the user via the display device. As an example, steps 630, 640, 650, and 660 may be performed by processor 402.

Following step 660, step 670 involves receiving user feedback regarding the displayed computer-generated knowledge statement consequent. Step 680 involves a determination as to whether the user indicated whether the user-validated knowledge statement consequent is correct. If the user feedback indicates that the user-validated knowledge statement consequent is correct, step 690 involves moving the computer-generated knowledge statement having antecedent features that match the context features to the head of the case base. Such movement may occur via rule maintenance module 80. If, at step 690, the user-feedback indicates that the user-validated knowledge statement consequent is incorrect, method 500 proceeds to step 650, wherein the process proceeds to step 590 to create, during runtime, a new rule by performing an analogical contextual transformation, as discussed above.

In some embodiments of method 500, if not in run-time, method 500 further includes the steps of creating new computer-generated knowledge statements and storing the newly-created computer-generated knowledge statements in the memory storage device at the head of the generalization/analog case base. As an example, such steps may be performed by processor 402 in conjunction with memory 404. The step of creating new computer-generated knowledge statements may include creating a generalization via generalization module 70. Such step may include the step of selecting, by chance in proportion to the size of the base, either the case base or the generalization/analog base. The step may also include using a 3-2-1 skew algorithm, such as via 3-2-1 skew module 50, to select a knowledge statement having at least two antecedent features. The step may also include deleting one of the antecedent features of the selected knowledge statement, wherein the resulting generalized knowledge statement does not contradict an existing knowledge statement in the selected base.

Some or all of the steps of method 500 may be stored on a computer readable storage medium, wherein the steps are represented by computer readable programming code. The steps of method 500 may also be computer-implemented using a programmable device, such as a computer-based system. Method 500 may comprise instructions that, when loaded into a computer-based system, cause the system to execute the steps of method 500. Method 500 may be implemented using various programming languages, such as "C" or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

An example application to which the T6K may be applied involves autonomous submersibles that learn to recognize underwater mines using sonar interpreted neural networks.

After recognition, such submersibles may be configured to neutralize the identified mines. Multiples nets are needed to fuse different frequency sweeps and to enable 3-D recognition using binaural projections. There are only so many fundamental memories in each net so that further training would cause the loss of previous training Also, the submersibles cannot possibly be trained on each "view" they are likely so encounter. Functional similarity may differ from structural similarity under sonar. Neural nets are not capable of modes ponens. T6K is not only capable of this, but allows for inductive generalization. By combining the strengths of both subsystems, a more efficacious system results. By linking the neural nets through a T6K, symbolic reasoning of the inductive variety is enabled (i.e. a system of systems), which translates into superior performance given the same level of training/feedback.

Further, the T6K may be implemented in an unmanned aerial vehicle (UAV) capable of adaptive intelligence using randomization with optimal learning functions. Such a vehicle will be capable of executing several maneuvers such as basic hovering, steep approach, confined area approach, and basic altitude flying. The T6K may be incorporated into such a UAV to assist in development of the vehicle guidance software. Such an approach allows for the capture of common-sense reasoning that is critical to the emulation of aspects of human creativity, such as a pilot's decision-making process.

The UAV may include an autonomous software-writing controller that may employ the T6K to iteratively use the human-in-the-loop in teach mode. In such a mode, the user is equivalently programming by testing to generate its rule base. Note that the UAV will also enter a dream mode when idle, whereby it can autonomously generalize its rule base to allow for more situations to be covered. This means that its subsequent performance will continue to improve while on the ground for a few hours after being flown. The expectation is that the autonomous software-writing controller will be able to generate the appropriate software control functions for the required operations in a flight scenario more efficiently and effectively than other options, such as a tuned-PID or neural network controller.

System Description and Operation

The following discussion will provide more detail and insight into the system and methods described herein. In general, cases differ from rules in that their situational half may embody considerable extraneous material. A domain expert creates rules by eliminating such material. In a Type 6 KASER (T6K), the algorithm converges on this capability by exploiting randomization.

Antecedent and consequent predicates are defined to be atomic macros, which means that they are immutable singletons and maximally reusable. Case antecedents are defined by sets of Boolean functions. A case consequent is defined by a procedure. Executed consequents may directly or indirectly affect context functions (e.g., by turning a camera or posing a question, respectively). Intelligence is embedded in the case base and is not to be imbued in its constituent predicate definitions unless it is eminently practical to do so for domain-specific applications. This T6K can acquire, generalize, and analogously extend heuristic bases as well as optionally evolve better feature sets.

Cases are acquired as in a conventional CBR system. Feature extraction can be extremely complex (e.g., identifying a human in an image represented in the form of a serial bit sequence output by an HD color video camera). Such features can be supplied by the output of one or more trained (and boosted) neural networks. Simple features can be captured in an Excel Spreadsheet.

The definition of features is tied to Saul Amarel's classic representation problem. For example, the cognitive scientist John Anderson has debated whether humans use imaginal or propositional models for representing knowledge. Similarly, the choice of representation will determine the outcome of various set operations. For example, the sets {salt} and {NaCl} are only semantically equivalent. Such semantic equivalence can be discovered through the existence of a common consequent (see below), and/or through the knowledge-based actions of a possibly distinct T6K system(s).

Features can be supplied by random instantiations of tractably defined domain-specific schemata, which may be synthesized by a domain-specific production system or System of Systems (SoSs)—such as a system of T6Ks. Features must allow for rapid computation, are assigned mnemonic labels, and are acquired incrementally. New features replace old features (not base variables) in the hope that the resulting antecedent has greater discriminatory power for properly mapping the associated consequent. Greater discriminatory power means that one case can replace (randomize) two or more cases having a common consequent. Perfect discriminatory power means that a single antecedent is sufficient to properly map all conditions to a unique consequent. However, this is quite unlikely in practice and would serve to prevent the formation of analogs as they would then not be needed. Perfect features, taken together, return TRUE just in case of a certain consequent. Simply better features, taken together, properly return TRUE a greater percentage of the time than lesser features.

The specification and number of features to be concomitantly replaced is selected by uniform chance to be between one and the number of features in the antecedent. Replaced features may be expanding, contracting, or stable. The number of base variables plus features never exceeds some machine-dependent limit. The newly synthesized feature-based case is acquired just in case it can replace at least two other cases in the case base (but does not actually do so; rather, the less useful cases will eventually fall off of the tail) and does not incorrectly map any other case in the case base. The aforementioned requirement for two or more cases prevents inclusion of spurious feature combinations. No incorrect maps are permitted here to maximally allow for the formation of analogs.

Features can redefine case antecedents and their generalization/analogs in dream mode (an otherwise idle time when randomization may occur—see below). The choice between generalization (i.e., when the generalization/analog base is not full) and feature evolution is made by uniform chance (or in parallel). The inclusion of such feature evolution is optional because features may be predefined for many application domains of practical import.

Cases and generalizations/analogs are subject to random generalization (i.e., one antecedent predicate at a time during dream mode), which may not lead to a contradiction on the deterministic case base (i.e., where the antecedent sets are identical, but the associated consequents are distinct). The deterministic generalization/analog base is updated in the event of contradiction (see below).

Analogical transformations are limited to antecedents, or the bases would necessarily be non deterministic, which would preclude checking them for contradiction. Moreover, a set of reduced-instruction consequents can be sequenced to synthesize a universal set of actions—just as a sequence taken from a limited set of words can realize any sentential semantics.

Analogs are not created in dream mode because they are on average the same size as their parents; whereas, an exponential number of candidate generalizations are strictly decreasing—implying greater information density/utility. That is why analogs are only created as needed at run time—ideally using as many parallel processors as can be brought to bear.

The equivalent of analogically transforming consequents may be achieved as follows. A consequent sequence can be iteratively optimized or otherwise replaced by an analog. Such may be accomplished by associating each such consequent with a distinct Boolean function. For example, the "sort" procedure, which sorts a list may be associated with the "sortp" function, which returns true just in case the sort function has been applied (or the list is sorted). Then, a set of such functions defines the result of applying a procedural sequence. This means that a somewhat arbitrary procedural sequence can fire a rule via a (transformed) context, which defines its (iterative) replacement. Such a defined System of Systems resembles Broca's area of the brain. It provides for co-dependent systems for "optimizing" consequent subsequences.

New cases are acquired at the logical head of the case base; while, new generalizations are acquired at the logical head of the generalization/analog base if non-contradicting on the case or generalization/analog base. If non-contradicting on the case base, but contradicting on the generalization/analog base, then the erroneous consequent is replaced without any logical movement to reflect the relative vacillation of this rule. The stability of the system is insured by maintaining a relatively large queue so as not to significantly flush out previously fired generalizations/analogs by acquiring new ones at the head. The tail of the generalization/analog base, in comparison with the generalizations above it, is less likely to contain useful generalizations/analogs, subsequent to firing, because fired generalizations/analogs are logically moved up.

The test for contradiction may be sped up by an order of magnitude by way of also maintaining each case and generalization/analog in a hash table (including case or generalization/analog type, antecedent, and consequent). The use of extra space here makes for more efficient dreaming and testing for contradiction with scale. This also simulates the associative memory function of the brain. Nevertheless, time to search linked lists is limited by local memory, which itself would be needed to maintain such hash tables along with the extra time incurred to update the same.

Moreover, updates to the generalization/analog base require search of the linked list in any event. Thus, unless the linked lists are rendered more efficient (e.g., using associative memory as hardwired in the brain), there is no order of magnitude advantage to incorporating hashing for faster retrieval here. Hashing should also not be used instead of linked lists for a faster search (with scale) for a most-specific contextual match by visiting non-increasing subsets of the context because the number of such subsets is $2^n-1$ (where n is the number of contextual predicates), which grows far faster than the m base rules with scale. Note that a separate base consisting of acquired symmetric mapping rules has not been used for generalization because the space-time overhead required to do so would serve to decrease the efficiency of this algorithm by an order of magnitude.

Again, cases and their generalization/analogs are randomly and iteratively selected by chance for generalization of a single antecedent predicate during dream mode. The distribution here is skewed using the 3-2-1 skew (see below) to favor the logical head of the selected list in keeping with Denning's principle of temporal locality. (In a SIMD architecture the processor containing its selected production is selected by uniform chance and checked against the cases and generalizations/analogs held in each processor in parallel (and they against it) as they become available. Not all processors need be so checked at all times in keeping with the concept of a heuristic validation.) That is, cases and generalization/analogs, which were most recently acquired, fired, or validated (and thus appear at their list heads), are proportionately more likely to be selected for generalization under the 3-2-1 skew. The choice between attempting to generalize the case base or the generalization/analog base, where applicable, is made by uniform chance in proportion to the size of each base (i.e., favoring the larger one) so as to simulate a single unified base (or in parallel).

Cases and their generalization/analogs may only move to the logical head of their resident processor, where each processor independently realizes this skew for its local memory. Such processor subdivision also serves to insure that the linear searches for pattern matches remain tractable. It similarly insures that the following 3-2-1 skew is subdivided into relatively short blocks so that all rows remain relatively accessible in practice.

The closer a case or generalization/analog is to the top of its linked list, the greater the likelihood of its selection. A good scheme (i.e., the 3-2-1 skew) for achieving this with an application domain base of r cases or generalization/analogs is to assign the head case or generalization/analog a probability of being selected of $$\frac{2r}{r(r+1)}.$$

The case or generalization/analog just below the head case or generalization/analog has a probability of being selected of $$\frac{2(r-1)}{r(r+1)}.$$

Finally, the tail case or generalization/analog of the base has a probability of being selected of $$\frac{2}{r(r+1)}.$$

The ith rule from the head has a probability of being selected of $$\frac{2(r+1-i)}{r(r+1)},$$

for i=1, 2, . . . , r.

The better the feature sets, the more compact will be the case and generalization/analog bases and again, the less the need for computational analogy. Cases and their generalizations/analogs are moved to the head of their respective lists whenever they are fired in the absence of erroneous feedback and are expunged on a least-recently-used (LRU) basis (i.e., from the bottom up) when space is at a premium (see below). Again, cases and their generalizations/analogs must be deterministic. Observe that, {u w}→a, and {v w}→a (where, {w}→a may also be resident because not all such rules will survive—if too general, the rule will be expunged; if too specific, it will fall to the logical bottom of its list to be reclaimed) allows {u w}←→{v w} (or, {w}←→{u w} | {v w}) in an (expanding/contracting/stable Type 0) candidate analogical substitution. The substitution of u for v (or vice versa) can only be made in the presence of w here. The labeled sets {u, w} and {v, w} represent candidate equivalent feature sets here. Analogs are employed in an attempt to acquire a most-specific contextual match (see below). Cases and their generalization/analogs are logically grouped by common consequent to facilitate such transformations.

Distinct domains can be at least partially linked through common general consequents—providing for generalized cross-domain transference, where the consequents reside in the same logical (not necessarily physical) case and/or generalization/analog KB segments. Segment is implicitly defined by the context or antecedent and not by any partial ordering of consequents (e.g., u→a; u v→b; u w→b; and, u v x→c is equivalently replaced by [u→a [w→b; v→b [x→c]]]), which is necessarily inefficient (e.g., individual rules cannot be moved to the list head), redundant (rules are stored multiple times depending on which antecedent prefix is used), etc. Again, cases and generalizations/analogs having subsumed antecedents for the same consequent are both saved in the same logical KB segment. That is why it is proper to generalize only one antecedent predicate at a time. The sum of the sizes of the case and generalization/analog bases is not allowed to exceed an implementation-dependent constant. Were this to occur, then memory is reclaimed from the tail of the generalization/analog base until it is empty. That is, memory may only be reclaimed from the tail of the case base if the generalization/analog base is empty. This serves to preserve the most-valuable validated knowledge.

Analogical substitution implies contextual randomization, which is not necessarily spatial, but is semantic—enhancing the overall learning capabilities (intelligence) of the system. One contextual transformation can enable another through contractions, expansions, and otherwise substitutions (i.e., again, Type 0 grammatical generality). Then too, one wants to fire the most-specific covered antecedent, which was found using the fewest contextual transformations. Analogical substitution can certainly create unnatural contexts, but these are less likely to result in a maximally-specific covering for some case or generalization/analog antecedent(s). The antecedent case base exerts an evolutionary pressure of sorts to favor properly transformed contexts. The generalization/analog base does likewise, since it directly/indirectly derives from the case base, respectively.

Type 0 generality cannot be satisfied by hill climbing, the goal of which is to reduce the distance between the context and a covered antecedent at every step. The result of more or less random contextual transformation need not initially cover some antecedent, but must do so (or be nearer to doing so) upon conclusion, if an answer is to be found. In some cases, no contextual transformation is needed to find the rule that is ultimately fired (i.e., a perfect match). In other cases, iterative contextual transformation will result in the rule that is ultimately fired. For example, the context, {a, b, c, d, e} could immediately fire the rule say, {c}→action though the context itself remains mostly unutilized; but, the fewest transformations that lead to say the similar context, {f, g, h, i}, where the rule say, {f, g, h}→distinct action, is a more-specific covering and is thus preferentially fired. The longest covered antecedent found, if any, during the search period (across multiple processors), where ties are resolved in favor of the fewest contextual transformations (and otherwise in favor of the case base and the logical head) is the case/generalization/analog to be fired. This also serves to churn the bottom of the linked lists for purposes of annealing because fired cases/generalizations/analogs, which match a transformed context do not necessarily reside in the more-recently fired KB segments. Contextual transforms are not logically moved unless their associated consequent is fired to properly reflect actual usage.

If the original context is not found to be identical to some antecedent in the case or generalization/analog bases; then, the most-specific match for the original context, if any, will be saved after the first pass. Next, contextual transformations are applied bi-directionally (but never an Id transformation) at uniform chance (across parallel processors) using the 3-2-1 skew (i.e., random agenda mechanism) to select candidate transforms. This process is iterated until a most-specific match is found and/or where the most-specific match using the fewest contextual transformations (resolving ties in favor of the case base and the logical head) is found, if any, upon interrupt. This interrupt may be determined by a System of Systems (SoS), or equivalently in neurological terms, a reticular formation. Similarly, the system may be set to return upon the first found (not necessarily optimal) match, if any, but being interrupt-driven in practice precludes the need for this capability in general, since it is always preferable to have a more-specific match (i.e., better result) than idle processors. Then too, the more contextual states that are generated under transformation, the greater the number of equivalent rules (and thus transformations) that will be potentially learned.

Search reverts to the original starting context whenever a previously generated state for this iteration repeats (favoring fewer contextual transformations, as desired). Note that terminal nodes cannot otherwise exist in a bidirectional search. A local hash table is maintained and linked to the applied transforms such that duplicate contextual states are never created and the same results in purging the current hash table.

Analogical explanations, if any, may be generated by replaying sequences of contextual transformations along with their resultant contextual states, which have enabled a most-specific match. The most-specific covering, using the fewest transforms (resolving ties in favor of the case base and the logical head), is maintained in a list, which holds the best solution so far (along with its specificity, depth of transformation, containing base, relative position from the head, contextual states, and transformations thereof) and is checked for update after finding a most-specific match, if any, after each contextual transformation.

The 3-2-1 skew is designed to be applied in generalizing the bases (see above) and in the application of analogical transforms to the context on the basis of temporal locality. It applies to the cases and generalizations/analogs of greatest utility, while progressively extending its scope. Notice that the possibility for analogical feature extraction as well as reuse has been maximized by defining consequents to be single mnemonics. Also, the more general the rule, the more likely it is to participate in contextual transformation. Contexts are paired with their proper consequents, when known (and may be stacked until then when awaiting feedback), and acquired as new cases. The process of replacement insures that a redundant or contradictory rule will not be present. Again, new generalizations, which result from dreaming, replace their contradiction, if any, if it occurs in the generalization/analog base by maintaining the current logical position and substituting consequents "in-line". They are not moved to the head of the generalization/analog base because they are seen as being relatively less stable or valid than a presently unknown generalization/analog.

Analogs do not reside in a distinct base because there is only one base characterization—validated or not. That is, generalizations and analogs are incomparable with respect to their inherent validity (i.e., unlike in comparison with cases). Validated generalization/analogs are acquired as new cases at the list head. Otherwise, fired case or generalization/analog consequents are moved, along with their associated antecedents, to their list heads. Again, generalizations, induced during dreaming, are inserted at their list head if non-contradicting, or they replace the contradicting member of the generalization/analog base in the same list position. In no situation, may a generalization contradict a member of the case base without being validated. Of course, any erroneous knowledge is expunged upon discovery.

The 3-2-1 skew is adaptive to the current domain because contextual transformation(s) tend to be derived from the more recently acquired/fired cases and generalizations/analogs, which correspond to the more recently visited domains. The base(s) from which each side of a candidate contextual transformation is taken are selected by chance in proportion to the size of the case and generalization/analog base so as to simulate a single unified base (or in parallel), where the larger the base, the relatively more frequently it is selected. Then, the interior case or generalization/analog is selected using the 3-2-1 skew for that base. Thus, one side of such a transform may be taken from the case base and the other from the generalization/analog base, or in any combination thereof—depending on user settings (see below). Such transformation tends to become more creative with time as the skew widens its search for a successful transform.

The process of contextual matching allows the user to extrapolate antecedent subsets at any point in the contextual specification process. Here, the existence of a partially-matched antecedent specification results (i.e., with user permission) in a listing of antecedent predicates occurring in cases and their generalizations that most-frequently co-occur along with the subset specification—ordered in non-increasing frequency of occurrence and otherwise cases and most-recently used (MRU) rules first. The system effectively minimally queries the user until the complete context has been elicited, or the user wishes to attempt an analogical match. The user may switch to manually specify the context or consequent, as appropriate, at any time, where the new definitions may be acquired by the relevant pull-down menu. Here, rule deletion will not cause dangling pointer problems, as would be the case if a grammatical inference method for auto-extrapolation were developed in lieu.

Selectable predicates are maintained in two lists—one for contexts or antecedents and one for consequents. A list of reusable predicates is found by scrolling up and down a lexicographically ordered list and/or by entering a one or more letter case-insensitive prefix for that predicate, which is matched using the Explode command or equivalent (e.g., (explode 'car) yields "C A R", which may be converted to lower case, as necessary). Thus, specifying the prefix say, "car" might retrieve the sorted list, (carburetion carburetor carburize carcajou . . . ). New predicates may also be acquired from the user by way of entry in the context or consequent textboxes, as appropriate, or by not finding an exact word-match for the prefix in the relevant pull-down menu.

The firing of a case or generalization/analog, which yields a correct result, as deemed by the user, implies the acquisition of the original context paired with the correct consequent at the head of the case base. In the event that this case already exists in the case or generalization/analog base, it simply moves to the list head of the case base. A maximum of one such contradiction may exist over both bases in which case the correct rule will be acquired as before, where its contradiction is expunged. Each transformed context, if any, in the sequence leading to and including a selected most-specific match is likewise paired with the correct consequent and acquired at the head of the case base, but only if this does not lead to a contradiction there unless validated. This follows because untransformed contexts get priority of association here. Similarly, each transformed context implying an erroneous consequent needs to be expunged if it occurs in the generalization/analog base and case base only if invalidated.

Note that there are in general many transformational sequences that will arrive at the same contextual state from one or more starting states. In grammar theory, such transformations are said to be ambiguous. They serve to increase the utility of a contextual state, since it is more likely to be reached again under transformation. Thus, it is more likely to replay the correct consequent.

The firing of a case, generalization/analog, or sequence thereof, which yields an incorrect result, as deemed by the user, implies the acquisition of the correct case based on the original context paired with the correct consequent, which replaces its contradiction as soon as relevant feedback is provided. In the absence of the correct consequent, the erroneously matched and fired rule is expunged, or "forgotten" (despite the fact that the contextual transformation process is more or less random and not likely to result in the same match if rerun). Again, each transformed context, if any, in the sequence leading to and including a selected most-specific match is likewise paired with the correct consequent, when available, and is acquired at the head of the case base, but only if this does not lead to a contradiction on the case base (a contradiction found in the generalization/analog base is thus replaced), since the rule itself is not validated. If the correct consequent is not forthcoming, then the context, or transformed context, rule pairing is not acquired. If a rule is found to be in error then it is expunged from the case base and all of its analogs, if any, are expunged from the generalization/analog base. Note that just moving all members of an erroneous fired sequence to their list tails does not guarantee non-replay of the same error because in theory at least, no constituent member need ever be expunged, where the fired sequence is not necessarily position sensitive.

Once a context(s) is paired with a correct consequent and acquired, the resulting case(s) (and subsequent generalizations/analogs thereof) can be matched by similar contexts using fewer contextual transforms. This implies that learning is necessarily super-linear, which is a claim unique to the KASER. Once an erroneous rule is identified, it needs to be expunged along with its analogs. This implies that forgetting is necessarily super-linear too, which represents another claim unique to the KASER. The twin processes of learning and forgetting requires validation for the case base, while analogical results are allowed in the generalization/analog base.

The possibility for a fired case or generalization/analog (incorporating manual extrapolations) depends on the number of non-redundant contextual transformations that were made in order to obtain a most-specific match, in the allowed timeframe, given the available number of processors. Traditional expert systems have a possibility rank of zero (i.e., "Excellent"), since they do not transform the context, but then like a deductive system they fail to find a proper match more often than they succeed. The higher the relative rank, the less confidence that is to be associated with the result (e.g., 1 is "Very Good"; 2 is "Good"; 3 is "Satisfactory"; 4 is "Fair"; 5 is "Poor"; and, 6 or more is "Very Poor"). These default interpretations uniformly occupy fixed positions on the slider, where only the numbers themselves may increase. The relative rank and its interpretation should both be shown on a slider that ranges from Excellent (0) to Very Poor (X). Here, X is initialized to 6 and is dynamically increased by a succession of integer multiples (see below) to include the greatest possibility rank computed to date [for the current application domain). In any sequence of fired cases and/or generalizations/analogs, the possibility of the sequence is defined to be the maximum possibility rank (i.e., the greatest integer) associated with its constituent members.

Poor possibilities imply caution and are not necessarily indicative of an error. The possibility differs from a Certainty Factor (CF) because it measures the potential for error creep—not that of absolute or assigned and propagated validity metrics. The T6K may be optionally designed to propagate the product of user-supplied case CFs using fuzzy logic, if desired. Here, if the context was not transformed and the match was taken from the case base, then the certainty factor is "High". If however this match was taken instead from the generalization/analog base, or if the context was transformed to obtain a match from the case base, then the certainty factor is "Medium". However, in all other cases, the CF is "Low".

The following represents a brief overview of the operation of various modules that may be included within the systems and methods in accordance with the Type 6 KASER for Providing Case-Based Inductive and Analogical Reasoning.

3-2-1 Skew Module

In the 3-2-1 Skew, the distribution is skewed in favor of more recently fired cases or generalization/analogs. The 3-2-1 skew is adaptive to the current domain because contextual transformation(s) tend to be derived from the more recently acquired/fired cases and generalizations/analogs, which correspond to the more recently visited domains. The 3-2-1 Skew tends to create the generalizations of highest current utility a priori. It favors the logical head of the selected list in keeping with Denning's principle of temporal locality. In a parallel architecture the processor containing its selected production is selected by uniform chance and checked against the cases and generalizations/analogs held in each processor in parallel (and they against it) as they become available. Not all processors need be so checked at all times in keeping with the concept of a heuristic validation.

Cases and their generalization/analogs may only move to the logical head of their resident processor, where each processor independently realizes this skew for its local memory. Such processor subdivision also serves to insure that the linear searches for pattern matches remain tractable. It similarly insures that the following 3-2-1 skew is subdivided into relatively short blocks so that all rows remain relatively accessible in practice. Cases and generalization/analogs, which were most recently acquired, fired, or validated (and thus appear at their list heads), are proportionately more likely to be selected for generalization under the 3-2-1 skew.

Feature Evolution Module

Antecedents/contexts defined by sets of Boolean functions. Consequents must be a single predicate. Consequents may be defined by words or an underlying procedure(s). Executed consequents may directly or indirectly affect context functions. The T6K can backend boosted neural networks. The T6K can learn that {salt} and {NaCl} are semantically equivalent. Distinct T6K systems can be programmed to effect domain-specific creativity. Features map consequents better than base variables. They may evolve from operant combinations of base variables. They serve to reduce the number of rows having the same consequent.

Perfect features serve to obfuscate the need for analogs. Non determinism is defined by where the antecedent sets are identical, but the associated consequents are distinct. Note that analogical transformations are limited to antecedents, or the bases would necessarily be non deterministic, which would preclude checking them for contradiction. Nevertheless, any desired action can be synthesized from an appropriate sequence of primitive consequents. Define a candidate feature space through the use of operators and base variables. Feature spaces may not be intractable. Features may be created by chance, or through chance instantiation of domain-specific schemata, and/or through the actions of a T6K or system of T6Ks.

Rule Maintenance and Movement Module

Cases and their generalizations/analogs must be deterministic. Not all rules will survive—if too general, the rule will be expunged; if too specific, it will fall to the logical bottom of its list to be reclaimed. New cases and generalizations/analogs are acquired at the logical head of their respective base. Cases and their generalizations/analogs are moved to the head of their respective lists whenever they are fired in the absence of erroneous feedback. Explicitly test that the sum of the sizes of the case and generalization/analog bases does not exceed an implementation-dependent constant, or reclaim memory.

Memory may only be reclaimed from the tail of the case base if the generalization/analog base is empty. This serves to preserve the most-valuable validated knowledge. Memory is reclaimed, as necessary, from the tail of the G/A base until it is empty. When the case/generalization-analog base memory becomes 50 percent full, an error message should be issued to the user that the implementation-dependent constant, representing the sum of the base sizes, needs to be increased by say a suggested 50 percent (i.e., issue the actual number), or as large as practical. Cases and their generalizations/analogs are expunged on a least-recently used (LRU) basis (i.e., from the logical bottom up) when space is at a premium.

Generalization Module

The choice between attempting to generalize the case base or the G/A base is made by uniform chance in proportion to the size of each base (i.e., favoring the larger one) so as to simulate a single unified base (or in parallel). Thus, if one case and nine generalizations/analogs, choose a uniform random integer [0, 9]. Select from the larger base if the random integer lies in [1, 9] and from the case base just in case the random integer is [0]. Analogs are not created in dream mode because generalizations have greater information density/utility.

Proportionately select the case base or G/A base for generalization. Select the actual case or generalization/analog using the 3-2-1 SKEW (or uniform distribution if enabled). The selected antecedent consists of at least two predicates or Interrupt or Wake-Up. Select one antecedent predicate at a time for generalization. Select one antecedent predicate, at uniform chance, from the set of antecedent predicates of the chosen case or generalization/analog for deletion, until the generalized rule does not result in a contradiction on the case base or Interrupt or Wake-Up. If the generalized rule does not result in a contradiction on the generalization/analog base do rule maintenance and movement. Acquire the generalized rule at the head of the generalization/analog base, else, replace the consequent of the contradicted rule with that of the new rule, while maintaining its current logical position in the linked list Find Optimal Match Module Review each antecedent in the case base followed by each antecedent in the G/A base, in turn from head to tail. Whenever the context covers the visited antecedent, if the number of predicates in the visited antecedent is greater than the most specific match, then perform a most specific match routine until either the end of the base is reached, the most specific match equals the contextual predicates, or an interrupt occurs. The most specific match is the number of predicates in the visited antecedent. The matched rule is the rule associated with the most specific match found. The system should never take an analog match over a perfect match for an untransformed context.

Form Candidate Analog Transform Module

Candidate analog transforms are of Type 0 generality. They are employed in an attempt to acquire a most-specific contextual match. One contextual transformation can enable another through contractions, expansions, and otherwise substitutions (i.e., again, Type 0 grammatical generality). The labeled sets $\{u, w\}$ and $\{v, w\}$ represent candidate equivalent feature sets, where $\{u\ w\} \leftrightarrow \{v\ w\}$ (or, $\{w\} \leftrightarrow \{u\ w\} | \{v\ w\}$).

Cases and their generalization/analogs are logically grouped by common consequent to facilitate transformation, where practical. Contextual transforms are not logically moved unless their associated consequent is fired to properly reflect actual usage.

Select the case or G/A base, where enabled. The base(s) from which each side of a candidate contextual transformation is taken are selected by chance in proportion to the size of the case and generalization/analog base so as to simulate a single unified base (or in parallel), where the larger the base, the relatively more frequently it is selected. Thus, one side of such a transform may be taken from the case base and the other from the G/A base, or in any combination thereof. If the case base and G/A base are independently selected, then two skews are run in parallel to conclusion—upon which the bases are once again selected and the skews restarted.

Using uniform chance or the 3-2-1 Skew (as defined by a user-setting) for that base select the first/next candidate rule. This defines the selected consequent. Search from the position of this first/next candidate rule up to the head of the linked list until the first distinct rule is encountered, if any, such that the most-recent (transformed) context covers the associated selected antecedent (this may be accomplished using a singly-linked list by searching downwards while updating the most-recent match. If the distance to a match, if any, is greater than zero, then search from the position of this first/next candidate rule down to the tail (or current number of logically included rows—not to exceed the absolute value of the distance previously found, if any) of the linked list until the first distinct rule is encountered, if any, such that the most-recent (transformed) context covers the associated selected antecedent. Select that rule closest to the immediately prior selected first/next candidate rule (i.e., the starting point). Resolve all ties through the flip of a coin. This insures that a covered antecedent will be found if one exists in the bases. Else, select that immediately prior selected first/next candidate rule. Select the case or generalization/analog base, where enabled.

The base(s) from which each side of a candidate contextual transformation is taken are selected by chance in proportion to the size of the case and G/A base so as to simulate a single unified base (or in parallel), where the larger the base, the relatively more frequently it is selected. Similarly, select the next candidate rule. Search from the position of this next candidate rule up to the head of the linked list until the first distinct rule is encountered, if any, having the same consequent (this may be accomplished using a singly-linked list by searching downwards while updating the most-recent match). If the distance to a match, if any, is greater than zero, then Search from the position of this next candidate rule down to the tail (or current number of logically included rows—not to exceed the absolute value of the distance previously found, if any) of the linked list until the first distinct rule is encountered, if any, having the same consequent. Select that rule closest to the immediately prior selected next candidate rule (i.e., the starting point). Resolve all ties through the flip of a coin. This at least approximates the desired selection, while being economical of search time. Else, select that immediately prior selected next candidate rule, until the rules have a common consequent (implying distinct antecedents) or an interrupt occurs. If the rules have a common consequent (implying distinct antecedents), then return either Antecedent) or Antecedent2.

Most-Specific Covering Using Fewest Transforms Module

One wants to fire the most-specific covered antecedent, which was found using the fewest contextual transformations. Type 0 generality cannot be satisfied by hill climbing, the goal of which is to reduce the distance between the context and a covered antecedent at every step. The result of more or less random contextual transformation need not initially cover some antecedent, but must do so (or be nearer to doing so) upon conclusion, if an answer is to be found. The context, $\{a, b, c, d, e\}$ could immediately fire the rule say, $\{c\} \rightarrow$ action; but, the fewest transformations that lead to say the similar context, $\{f, g, h, i\}$, where the rule say, $\{f, g, h\} \rightarrow$ distinct action, is a more-specific covering and is thus preferentially fired. The longest covered antecedent found, if any, during the search period (across multiple processors), where ties are resolved in favor of the fewest contextual transformations (and otherwise in favor of the case base and the logical head) is the case/generalization/analog to be fired. Context must be sorted to facilitate pattern-matching operations. Matching transformed contexts anneals the logical rule ordering.

Find Optimal Match Module

If there is no optimal match, the module needs to iteratively find the most-specific match using the fewest contextual transformations. Duplicate contextual states are never created and the same results in purging the current hash table. The transformed context list records the sequence of contexts and transforms—including the final fired rule. The analogical explanation list records the sequence of contexts and transforms—including the final fired rule. This list is globally known here though this is implementation dependent. Contextual predicates are defined to be the number of predicates in the context.

Form Candidate Analogical Transform Module

Care must be taken not to restart either skew until both reach their uniform conclusion, or a new starting context is supplied. Context must now cover first antecedent without loss of generality. User employs GUI features (shown in FIG. 3) to specify a context/consequent. Again, a file/tty structure may be used in lieu of a GUI using Corman Lisp. Contextual/consequent specification may be from a dictionary or by aggregation of previously unknown contextual/consequent predicates. A list of reusable predicates is found by scrolling up and down a lexicographically ordered list and/or by entering a one or more letter case-insensitive prefix for that contextual/consequent predicate. Use the LISP EXPLODE command (Graham, Advanced Lisp techniques) as follows (e.g., (explode 'car) yields "C A R", which may be converted to lower case, as necessary). Thus, specifying the prefix say, "car" might retrieve the sorted list, (carburetion carburetor carburize carcajou . . . ). A more sophisticated associative content-based retrieval mechanism may also be provided, whereby predicates are retrieved on the basis of their semantic and/or syntactic associations.

Acquire Context Module

If it is desired to extrapolate context, then create a list of all cases and generalizations/analogs for which the partially specified antecedent is a subset. NIL at the top of the extrapolation list means that the context can be fired as is with a perfect match. If the context is NIL, then the entire content of both bases is used for the list. For each antecedent predicate in the created list, omitting contextual predicates, create a frequency count for the number of rules that it occurs in within this list. Present these antecedent predicates in non-increasing order of frequency of occurrence and otherwise from the head to the tail of their base (cases before generalizations/analogs) in the pull-down extrapolation menu for iterative user selection, when NIL does not appear at the top of the extrapolation list UNTIL the entire list is presented or the user wishes to terminate extrapolation and do a literal acquisition or proceed with attempting to fire a rule Create Original Context Rule Module Once a context(s) is paired with a correct consequent and acquired, the resulting case(s) (and subsequent generalizations/analogs thereof) can be matched by similar contexts using fewer contextual transforms. This implies that learning is necessarily super-linear, which is a claim unique to the KASER. For each context on the transformed context list, in order from the most transformed context to the least (i.e., the original context), Create the rule, transformed context list member→proper matched rule consequent. If directly validated rule, then perform the rule maintenance and movement module. Acquire the new rule at the logical head of the case base—replacing its contradiction (i.e., if a new consequent). Else do; analogous to validated rule.

Expunge Analogous Rules Module

Once an erroneous rule is identified, it needs to be expunged along with its analogs. This implies that forgetting is necessarily super-linear too, which represents another claim unique to the KASER. For each context on the transformed context list, in order from the most transformed context to the least (i.e., the original context), do Identify the rule, transformed context list member→improper matched rule consequent. If directly invalidated rule, then, expunge the rule, transformed context list member→improper matched rule consequent if found in the case or generalization/analog base, Else, analogous to invalidated rule, expunge the rule, transformed context list member→improper matched rule consequent if found in the generalization/analog base.

Adjudicate Module

Make corrections to the case or generalization/analog base. If the consequent of the matched and fired rule is of unknown validity, then logically move the matched rule to the head of the containing base. Else, if the consequent of the matched and fired rule is deemed to be correct, then create an original context rule. Else, if it is invalid, expunge analogous rules. Request the proper consequent from the user (an optional stacking mechanism may be employed).

Certainty Factor Module

Displays the relative certainty one may have in the fired consequent. A possibility rank of zero implies an untransformed context. If the (possibility rank=0) and the (containing base="Case"), then CF="High", Else, If the ((possibility rank=0) and the (containing base="Generalization/Analog")) or the ((possibility rank>0) and the (containing base="Case")), then CF="Medium" Else, CF="Low".

Show Possibility Module

The possibility for a fired case or generalization/analog (incorporating manual extrapolations) depends on the number of non-redundant contextual transformations that were made in order to obtain a most-specific match, in the allowed timeframe, given the available number of processors. Poor possibilities imply caution and are not necessarily indicative of an error. A slider need not be shown using Corman Lisp—just the possibility numeric. Traditional expert systems have a possibility rank of zero (i.e., "Excellent"), since they do not transform the context. The higher the relative rank, the less confidence that is to be associated with the result.

Main Module

The equivalent of analogically transforming consequents is achieved using co-dependent systems for "optimizing" consequent subsequences. That is, systems of these programmed systems. Dream mode is an otherwise idle time when randomization for generalization may occur. Read-in saved data files. Repeat, if dream mode, selecting generalization or optional feature evolution using uniform chance (or in parallel). Else do, repeat, acquire context. Use the original context. Assist user with specification of a rule, which can be fired using the original context. Fire the most-specific covering using fewest transforms.

Many modifications and variations of the Type 6 KASER for Providing Case-Based Inductive and Analogical Reasoning are possible in light of the above description. Within the scope of the appended claims, the Type 6 KASER for Providing Case-Based Inductive and Analogical Reasoning may be practiced otherwise than as specifically described. Further, the scope of the claims is not limited to the implementations and embodiments disclosed herein, but extends to other implementations and embodiments as may be contemplated by those having ordinary skill in the art.

I claim:

1. A computer-implementable method comprising the steps of:
   storing, in at least one memory storage device in a computer, a case base and a generalization/analog base, wherein the case base comprises user-validated knowledge statements and the generalization/analog base comprises computer-generated knowledge statements, each of the user-validated knowledge statements and the computer-generated knowledge statements comprising a consequent and an antecedent with more than one antecedent features;
   receiving, from a computer input device, a user-specified context comprising more than one context features;
   searching the case base for a user-validated knowledge statement having antecedent features that match each of the context features;
   displaying the user-validated knowledge statement consequent to the user via a display device if a user-validated knowledge statement having antecedent features that match the context features is found; and
   receiving user feedback regarding the displayed user-validated knowledge statement consequent, wherein if the user feedback indicates that the user-validated knowledge statement consequent is incorrect the method further comprises the step of creating, during runtime, a new rule by performing an analogical contextual transformation by
      selecting one context feature from the user-specified context,
      selecting, by chance in proportion to the size of the base, either the case base or the generalization/analog base,
      searching the selected base for a first knowledge statement having an antecedent feature that matches the context feature,
      searching the selected base for a second knowledge statement having a consequent that matches the consequent of the first knowledge statement, substituting an antecedent feature of the second knowledge statement with the selected context feature, and searching the selected base for a knowledge statement including antecedent features matching the other context features from the user-specified context and the selected context feature.

2. The computer-implementable method of claim 1, wherein if the user feedback indicates that the user-validated knowledge statement consequent is correct, the method further comprises the step of moving the user-validated knowledge statement having antecedent features that match the context features to the head of the case base.

3. The computer-implementable method of claim 1 further comprising the steps of:

receiving user feedback regarding the created rule; and if the user feedback indicates that the new rule is correct, moving the new rule to the head of the case base.

4. The computer-implementable method of claim 1, wherein if a user-validated knowledge statement having antecedent features that match the user context features is not found, the method further comprises the step of searching the generalization/analog base for a computer-generated knowledge statement having antecedent features that match the context features.

5. The computer-implementable method of claim 4, wherein if a computer-generated knowledge statement having antecedent features that match the context features is found, the method further comprises the steps of:

displaying the computer-generated knowledge statement consequent to the user via the display device; and receiving user feedback regarding the displayed computer-generated knowledge statement consequent.

6. The computer-implementable method of claim 5, wherein if the user feedback indicates that the user-validated knowledge statement consequent is correct, the method further comprises the step of moving the computer-generated knowledge statement having antecedent features that match the context features to the head of the case base.

7. The computer-implementable method of claim 5, wherein if the user feedback indicates that the computer-generated knowledge statement consequent is incorrect, the method further comprises the step of creating, during runtime, a new rule by performing an analogical contextual transformation.

8. The computer-implementable method of claim 1, wherein if not in run-time, the method further comprises the steps of:

creating new computer-generated knowledge statements; and storing the newly-created computer-generated knowledge statements in the memory storage device at the head of the generalization/analog case base.

9. The computer-implementable method of claim 8, wherein the step of creating new computer-generated knowledge statements comprises the steps of:

selecting, by chance in proportion to the size of the base, either the case base or the generalization/analog base;

using a 3-2-1 skew algorithm, selecting a knowledge statement having at least two antecedent features;

deleting one of the antecedent features of the selected knowledge statement, wherein the resulting generalized knowledge statement does not contradict an existing knowledge statement in the selected base.

10. A non-transitory computer readable medium having a method represented by computer readable programming code encoded thereon, the method comprising the steps of:

searching a case base for a user-validated knowledge statement having antecedent features that match each context feature of a user-specified context comprising more than one context features, the user-specified context received from a computer input device, wherein the case base is stored, along with a generalization/analog base, in at least one memory storage device in a computer, wherein the case base comprises user-validated knowledge statements and the generalization/analog base comprises computer-generated knowledge statements, each of the user-validated knowledge statements and the computer-generated knowledge statements comprising a consequent and an antecedent having more than one antecedent feature;

causing a processor within the computer to display the user-validated knowledge statement consequent to the user via a display device if a user-validated knowledge statement having antecedent features that match the context features is found; and receiving, via the computer input device, user feedback regarding the displayed user-validated knowledge statement consequent, wherein if the user feedback indicates that the user-validated knowledge statement consequent is incorrect the method further comprises the step of creating, during runtime, a new rule by performing an analogical contextual transformation by selecting one context feature from the user-specified context, selecting, by chance in proportion to the size of the base, either the case base or the generalization/analog base, searching the selected base for a first knowledge statement having an antecedent feature that matches the context feature, searching the selected base for a second knowledge statement having a consequent that matches the consequent of the first knowledge statement, substituting an antecedent feature of the second knowledge statement with the selected context feature, and searching the selected base for a knowledge statement including antecedent features matching the other context features from the user-specified context and the selected context feature.

11. The non-transitory computer readable medium of claim 10, wherein if the user feedback indicates that the user-validated knowledge statement consequent is correct, the method further comprises the step of moving the user-validated knowledge statement having antecedent features that match the context features to the head of the case base.

12. The non-transitory computer readable medium of claim 10 further comprising the steps of:

receiving user feedback regarding the created rule; and if the user feedback indicates that the new rule is correct, moving the new rule to the head of the case base.

13. The non-transitory computer readable medium of claim 10, wherein if a user-validated knowledge statement having antecedent features that match the user context features is not found, the method further comprises the steps of:

searching the generalization/analog base for a computer-generated knowledge statement having antecedent features that match the context features; and if a computer-generated knowledge statement having antecedent features that match the context features is found, displaying the computer-generated knowledge statement consequent to the user via the display device, and receiving user feedback regarding the displayed computer-generated knowledge statement consequent.

14. The non-transitory computer readable medium of claim 13, wherein if the user feedback indicates that the user-validated knowledge statement consequent is correct, the method further comprises the step of moving the computer-generated knowledge statement having antecedent features that match the context features to the head of the case base, and wherein if the user feedback indicates that the computer-generated knowledge statement consequent is incorrect, the method further comprises the step of creating, during runtime, a new rule by performing an analogical contextual transformation.

15. The non-transitory computer readable medium of claim 10, wherein if not in run-time, the method further comprises the steps of:
- creating new computer-generated knowledge statements by
  - selecting, by chance in proportion to the size of the base, either the case base or the generalization/analog base,
  - using a 3-2-1 skew algorithm, selecting a knowledge statement having at least two antecedent features, and
  - deleting one of the antecedent features of the selected knowledge statement, wherein the resulting generalized knowledge statement does not contradict an existing knowledge statement in the selected base; and
- storing the newly-created computer-generated knowledge statements in the memory storage device at the head of the generalization/analog case base.

16. A system comprising:
- a central computer having a computer input device and a display device connected thereto; and
- a plurality of distributed processors communicatively coupled to the central computer
- wherein the central computer is configured to coordinate the activities of the distributed processors, wherein each of the distributed processors is a domain-specific subsystem configured to maintain a local a case base and a generalization/analog base, wherein the case base comprises user-validated knowledge statements and the generalization/analog base comprises computer-generated knowledge statements, each of the user-validated knowledge statements and the computer-generated knowledge statements comprising a consequent and an antecedent with more than one antecedent feature
- wherein each of the plurality of distributed processors are configured to, upon receipt of a user-specified context comprising more than one context feature from the computer input device, search the case base for a user-validated knowledge statement having antecedent features that match each of the context features and cause the user-validated knowledge statement consequent to be displayed to the user via the display device if a user-validated knowledge statement having antecedent features that match the context features is found
- wherein each of the plurality of distributed processors are further configured to receive user feedback, via the computer input device, regarding the displayed user-validated knowledge statement consequent, wherein if the user feedback indicates that the user-validated knowledge statement consequent is incorrect, each of the plurality of distributed processors are further configured to create, during runtime, a new rule by performing an analogical contextual transformation by
  - selecting one context feature from the user-specified context,
  - selecting, by chance in proportion to the size of the base, either the case base or the generalization/analog base,
  - searching the selected base for a first knowledge statement having an antecedent feature that matches the context feature,
  - searching the selected base for a second knowledge statement having a consequent that matches the consequent of the first knowledge statement,
  - substituting an antecedent feature of the second knowledge statement with the selected context feature, and
  - searching the selected base for a knowledge statement including antecedent features matching the other context features from the user-specified context and the selected context feature.

* * * * *